US011822404B2

(12) United States Patent
Qin et al.

(10) Patent No.: US 11,822,404 B2
(45) Date of Patent: Nov. 21, 2023

(54) POWER DISTRIBUTION SYSTEM AND SERVER SYSTEM

(71) Applicant: Huawei Digital Power Technologies Co., Ltd., Shenzhen (CN)

(72) Inventors: Zhen Qin, Shenzhen (CN); Chen Zhang, Shenzhen (CN); Bin Luo, Shenzhen (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 36 days.

(21) Appl. No.: 17/579,302

(22) Filed: Jan. 19, 2022

(65) Prior Publication Data

US 2022/0232726 A1    Jul. 21, 2022

(30) Foreign Application Priority Data

Jan. 20, 2021 (CN) .......................... 202110076929.2

(51) Int. Cl.
*G06F 1/26* (2006.01)
*H02B 1/04* (2006.01)

(52) U.S. Cl.
CPC ............... *G06F 1/263* (2013.01); *G06F 1/26* (2013.01); *H02B 1/04* (2013.01)

(58) Field of Classification Search
CPC ........ G06F 1/26; G06F 1/263; G06F 11/2015; G06F 1/30; H02B 1/04; H02J 1/086; H02J 2310/16; H02J 9/04; H02J 9/061; H05K 7/1492; H02M 1/00
USPC ........................................................ 713/300
See application file for complete search history.

(56) References Cited

U.S. PATENT DOCUMENTS

| 9,329,653 | B2 | 5/2016 | Dain |
| 2007/0114852 | A1 | 5/2007 | Lin et al. |
| 2009/0271642 | A1* | 10/2009 | Cheng .................... G06F 1/263 |
| | | | 713/300 |

(Continued)

FOREIGN PATENT DOCUMENTS

| CN | 101051747 A | 10/2007 |
| CN | 201051669 Y | 4/2008 |

(Continued)

*Primary Examiner* — Chun Cao
(74) *Attorney, Agent, or Firm* — WOMBLE BOND DICKINSON (US) LLP

(57) ABSTRACT

A power distribution system is provided in this application, which includes a plurality of power distribution equipments, and the plurality of power distribution equipments are configured to supply power to a plurality of powered devices respectively. First power distribution equipment in the plurality of power distribution equipments includes: a first power module, configured to perform voltage conversion on an input voltage to obtain an output voltage, where the output voltage is a supply voltage of the first power distribution equipment; and a first cascading circuit, configured to connect an output of the first power module to an output of a power module in power distribution equipment in the power distribution system other than the first power distribution equipment, where the first power distribution equipment is any power distribution equipment in the power distribution system. A server system which includes the power distribution system is also disclosed in this application.

18 Claims, 19 Drawing Sheets

(56) References Cited

U.S. PATENT DOCUMENTS

| | | | |
|---|---|---|---|
| 2012/0284539 A1* | 11/2012 | Cheng | G06F 1/263 |
| | | | 713/300 |
| 2012/0316689 A1 | 12/2012 | Boardman et al. | |
| 2013/0080793 A1 | 3/2013 | Familiant et al. | |
| 2014/0049117 A1 | 2/2014 | Rahman | |
| 2016/0294210 A1 | 10/2016 | Nguyen | |
| 2020/0059111 A1 | 2/2020 | Guo et al. | |
| 2020/0280208 A1 | 9/2020 | Chen et al. | |
| 2020/0313456 A1 | 10/2020 | Song et al. | |
| 2020/0341526 A1* | 10/2020 | Hu | H05K 7/20 |

FOREIGN PATENT DOCUMENTS

| | | | |
|---|---|---|---|
| CN | 101563829 A | 10/2009 | |
| CN | 102347633 A | 2/2012 | |
| CN | 202444315 U | 9/2012 | |
| CN | 202906586 U | 4/2013 | |
| CN | 103715754 A | 4/2014 | |
| CN | 104242428 A | 12/2014 | |
| CN | 207321602 U | 5/2018 | |
| CN | 207542868 U | 6/2018 | |
| CN | 109992082 A | 7/2019 | |
| CN | 112134448 A | 12/2020 | |
| CN | 212305143 U | 1/2021 | |
| CN | 112886694 A | 6/2021 | |

* cited by examiner

POWER DISTRIBUTION SYSTEM AND SERVER SYSTEM

CROSS-REFERENCE TO RELATED APPLICATIONS

This application claims priority to Chinese Patent Application No. 202110076929.2, filed on Jan. 20, 2021, which is hereby incorporated by reference in its entirety.

TECHNICAL FIELD

This application relates to the field of information technologies, and in particular, to a power distribution system and a server system.

BACKGROUND

A server is a high-performance computer that provides various services. It features high reliability, availability, manageability, and scalability. Redundancy configuration may be performed for a power supply of the server, to ensure that the server can still be properly powered upon an exception.

As shown in FIG. 1, in an existing server power architecture, an N+N backup mode is used for power supplies in power distribution equipment. In FIG. 1, an example with N=1 is used. One power distribution equipment is configured for one server. Two power supplies, namely, power supply A and power supply B, are configured for one power distribution equipment. A power supply in power distribution equipment may be considered as a voltage converter, which is configured to convert an input voltage into a supply voltage for a server. In the power architecture, input A supplies power to power supply A, and input B supplies power to power supply B, so as to implement input source backup. When one input source fails, the other input source can still supply power to the server. In addition, outputs of power supply A and power supply B are connected in parallel to implement power supply backup: When one power supply fails, the other power supply can still supply power to the server.

When a solution provided in the conventional technologies is used to perform redundancy configuration for a power supply, each power distribution equipment needs to use two power supplies, and backup costs are high. In addition, by using the foregoing power architecture, power supply A and power supply B jointly supply power to the server in most scenarios (in particular, scenarios without an exception), and a load ratio of the server is low, resulting in low power supply conversion efficiency.

For example, when one power supply supplies power to the server, the load ratio of the server is 35% to 45%. When power supply A and power supply B jointly supply power to the server, the load ratio of the server is reduced by about a half to about 20%. A relationship between the load ratio of the server and the power supply conversion efficiency may be shown in FIG. 2. As shown in FIG. 2, when the load ratio of the server is 35% to 45%, the power supply conversion efficiency is high. When the load ratio of the server is 20%, the power supplies cannot work in a status with high conversion efficiency.

In conclusion, power distribution equipment provided in the conventional technologies has problems of high backup costs, a low load ratio of a server, and low power supply conversion efficiency.

SUMMARY

Embodiments of this application provide a power distribution system and a server system, to implement power supply backup, reduce backup costs, and increase a load ratio and power supply conversion efficiency of a powered device.

According to a first aspect, an embodiment of this application provides a power distribution system. The power distribution system includes a plurality of power distribution equipments, and the plurality of power distribution equipments are configured to supply power to a plurality of powered devices respectively. First power distribution equipment in the plurality of power distribution equipments includes: a first power module, configured to perform voltage conversion on an input voltage to obtain an output voltage, where the output voltage is a supply voltage of the first power distribution equipment; and a first cascading circuit, configured to connect an output of the first power module to an output of a power module in power distribution equipment in the power distribution system other than the first power distribution equipment, where the first power distribution equipment is any power distribution equipment in the power distribution system.

In one embodiment, the powered devices may be servers.

According to the power distribution system provided in the first aspect, first power distribution equipment includes a first power module and a first cascading circuit. When the first power module is faulty, a power module in power distribution equipment in the power distribution system other than the first power distribution equipment jointly supplies power to the first power distribution equipment by using the first cascading circuit, so as to implement power supply backup. According to the power distribution system provided in the first aspect, redundancy configuration can be implemented for a power supply of power distribution equipment, and only one power module is disposed in each power distribution equipment. Compared with a solution in the conventional technologies that two power modules are configured in each power distribution equipment, in this application, backup costs are low, a load ratio of power distribution equipment is high, and power supply conversion efficiency of the power distribution equipment is high.

In one embodiment, when the first power module is faulty, the power module in the power distribution equipment in the power distribution system other than the first power distribution equipment supplies power to the first power distribution equipment by using the first cascading circuit.

According to the foregoing solution, power supply backup can be implemented.

The following uses two manners to describe a backup mode of an input source in the power distribution system provided in the first aspect.

Manner 1

In one embodiment, the first power module is further configured to select a first input source or a second input source to provide the input voltage for the first power distribution equipment.

Further, when selecting the first input source or the second input source to provide the input voltage for the first power distribution equipment, the first power module is configured to: when the first input source encounters a power supply exception, select the second input source to provide the input voltage for the first power distribution equipment; or when the second input source encounters a power supply exception, select the first input source to provide the input voltage for the first power distribution equipment.

According to the foregoing solution, the first power module is a dual-input power supply, and the first power module may select the first input source or the second input source through switching to implement input source backup.

In one embodiment, the first power module includes: a relay module, configured to select the first input source or the second input source to provide the input voltage for the first power distribution equipment; and a conversion module, coupled to the relay module and configured to perform voltage conversion on the input voltage to obtain the output voltage.

In addition, the first power module further includes: a unidirectional conducting circuit, coupled to the conversion module and configured to disconnect the conversion module from the output of the first power module when the first power module is faulty.

According to the foregoing solution, the unidirectional conducting circuit can implement an isolation function when a power supply is faulty, thereby preventing the failed power supply from affecting normal operation of another power supply. For example, in a normal state of the first power module in the first power distribution equipment, the unidirectional conducting circuit is on, and the first power module supplies power externally by using the unidirectional conducting circuit; or in an abnormal state of the first power distribution equipment, the unidirectional conducting circuit is off, so as to avoid affecting normal operation of a power module in another power distribution equipment.

In one embodiment, the unidirectional conducting circuit is on when the first power module is not faulty, or the unidirectional conducting circuit is off when the first power module is faulty.

Manner 2

In one embodiment, when performing voltage conversion on the input voltage, the first power module is configured to: perform voltage conversion on an input voltage provided by a first input source, to obtain an output voltage; and second power distribution equipment in the power distribution system includes: a second power module, configured to perform voltage conversion on an input voltage provided by a second input source, to obtain an output voltage, where the output voltage is a supply voltage of the second power distribution equipment; and a second cascading circuit, configured to connect an output of the second power module to an output of a power module in power distribution equipment in the power distribution system other than the second power distribution equipment.

According to the foregoing solution, a power module in power distribution equipment is a single-input power supply. When the first input source encounters a power supply exception, the second power module supplies power to the first power distribution equipment by using the second cascading circuit and the first cascading circuit; and when the second input source encounters a power supply exception, the first power module supplies power to the second power distribution equipment by using the first cascading circuit and the second cascading circuit, thereby implementing input source backup.

In one embodiment, the first power module includes: a first conversion module, configured to perform voltage conversion on the input voltage provided by the first input source, to obtain the output voltage; and a first unidirectional conducting circuit, coupled to the first conversion module and configured to disconnect the first conversion module from the output of the first power module when the first power module is faulty. The second power module includes: a second conversion module, configured to perform voltage conversion on the input voltage provided by the second input source, to obtain the output voltage; and a second unidirectional conducting circuit, coupled to the second conversion module and configured to disconnect the second conversion module from the output of the second power module when the second power module is faulty.

According to the foregoing solution, the first unidirectional conducting circuit can implement an isolation function when the first power module is faulty, and the second unidirectional conducting circuit can implement an isolation function when the second power module is faulty, thereby preventing a failed power supply from affecting normal operation of another power supply. For example, in a normal state of the first power module, the first unidirectional conducting circuit is on, and the first power module supplies power externally by using the first unidirectional conducting circuit; or in an abnormal state of the first power module, the first unidirectional conducting circuit is off, so as to avoid affecting normal operation of a power module in another server.

In one embodiment, the first power module includes a current equalization circuit, configured to generate a current equalization signal when an output current of the first power module is unequal to an output current of the power module in the power distribution equipment in the power distribution system other than the first power distribution equipment, where the current equalization signal is used to make the output current of the first power module equal to the output current of the power module in the power distribution equipment in the power distribution system other than the first power distribution equipment.

According to the foregoing solution, when the first power module is faulty, a power module in other power distribution equipment can jointly supply power to the first power distribution equipment by using the first cascading circuit. Because the other power distribution equipments have unequal distances to the first power distribution equipment, a phenomenon may occur, in which power distribution equipment closer to the first power distribution equipment has a larger output current (a higher output power) and power distribution equipment farther from the first power distribution equipment has a smaller output current (a lower output power). Disposing the current equalization circuit in the first power module can avoid this phenomenon, so that output currents of all power modules in the power distribution system are equal.

In one embodiment, the first cascading circuit includes an oscillation suppression circuit, configured to suppress voltage oscillation generated on a cascading line between the output of the first power module and the output of the power module in the power distribution equipment in the power distribution system other than the first power distribution equipment.

When a distance between power distribution equipments is long, a cascading line between cascading circuits is long, and a large parasitic inductance is generated on the cascading line. Consequently, oscillation is generated on the cascading line. According to the foregoing solution, oscillation on the cascading line can be suppressed, so that the output voltage of the first power module is stable.

In one embodiment, the first cascading circuit includes a power backup unit, where the power backup unit is configured to supply power to the first power distribution equipment when both the first input source and the second input source encounter a power supply exception.

According to the foregoing solution, power backup can be implemented in a scenario in which both the first input source and the second input source encounter a power supply exception, such as a mains outage, so that the power distribution equipment can still work properly.

In one embodiment, the power backup unit may include a battery and a battery management system (BMS).

According to a second aspect, an embodiment of this application provides a server system. The server system includes a plurality of servers, and the plurality of servers are powered by using the power distribution system according to any one of the first aspect and the possible embodiments thereof. In one embodiment, each power distribution equipment in the power distribution system is configured to supply power to one server in the server system.

DESCRIPTION OF EMBODIMENTS

The following further describes in detail the embodiments of this application with reference to the accompanying drawings.

It should be noted that "a plurality of" in the embodiments of this application means two or more than two. In addition, in the descriptions of this application, terms such as "first" and "second" are merely used for distinction and description, and shall not be understood as an indication or implication of relative importance or an indication or implication of an order.

Figure 3:
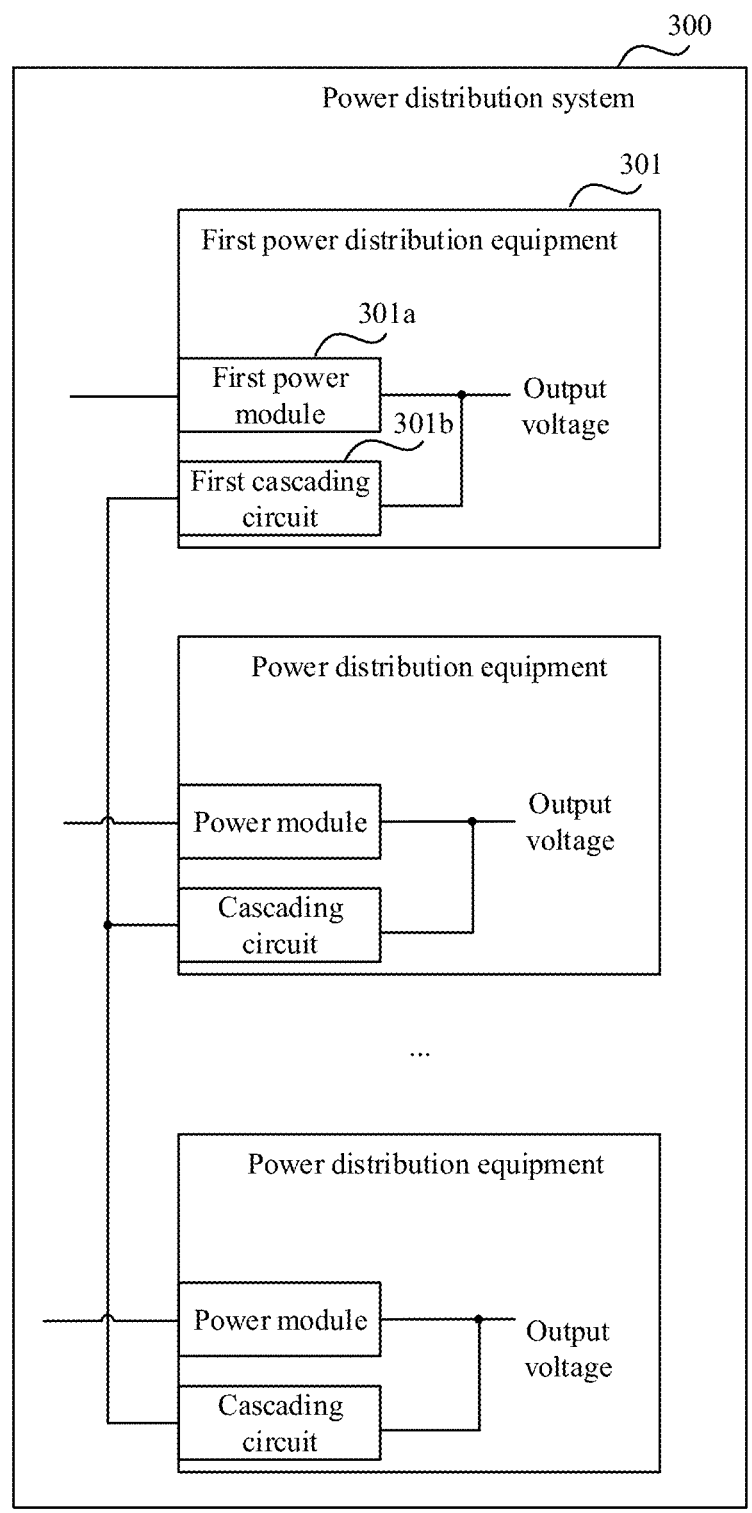
FIG. 3 is a schematic diagram of a structure of a first power distribution system according to an embodiment of this application.

FIG. 3 is a schematic diagram of a structure of a power distribution system 300 according to an embodiment of this application. The power distribution system 300 includes a plurality of power distribution equipments, and each power distribution equipment is configured to supply power to a powered device. First power distribution equipment 301 in the plurality of power distribution equipments includes a first power module 301a and a first cascading circuit 301b. The first power module 301a is configured to perform voltage conversion on an input voltage to obtain an output voltage. The output voltage is a supply voltage of the first power distribution equipment 301. The first cascading circuit 301b is configured to connect an output of the first power module 301a to an output of a power module in power distribution equipment in the power distribution system other than the first power distribution equipment 301.

In one embodiment, the powered devices powered by the power distribution equipments may be servers. The first cascading circuit 301b may be a cascading box.

The first power distribution equipment 301 is any power distribution equipment in the power distribution system. That is, each power distribution equipment in the power distribution system 300 includes one power module and one cascading circuit. For ease of description and differentiation, one power distribution equipment in the power distribution system 300 is referred to as the first power distribution equipment 301, a power module in the first power distribution equipment 301 is referred to as the first power module 301a, and a cascading circuit in the first power distribution equipment 301 is referred to as the first cascading circuit 301b.

In the power distribution system 300, supply voltages of all the power distribution equipments are the same, that is, output voltages of all power modules are the same, for example, may be 12 V.

The power distribution system 300 shown in FIG. 3 may implement power supply backup in the following manner: When the first power module 301a is faulty, a power module in power distribution equipment in the power distribution system 300 other than the first power distribution equipment 301 supplies power to the first power distribution equipment 301 by using the first cascading circuit 301b. It can be easily seen from FIG. 3 that, in the power distribution system 300, an output of a power module in each power distribution equipment is connected by using two cascading circuits. When the first power module 301a in the first power distribution equipment 301 is faulty, the power module in the power distribution equipment in the power distribution system 300 other than the first power distribution equipment 301 jointly supplies power to the first power distribution equipment by using the first cascading circuit 301b. For example, if the power distribution system 300 includes four power distribution equipments, when a power module in power distribution equipment fails, the other three power distribution equipments jointly supply power to the power distribution equipment by using the first cascading circuit.

The power distribution system 300 shown in FIG. 3 may implement input source backup in two manners.

Manner 1

Figure 4:
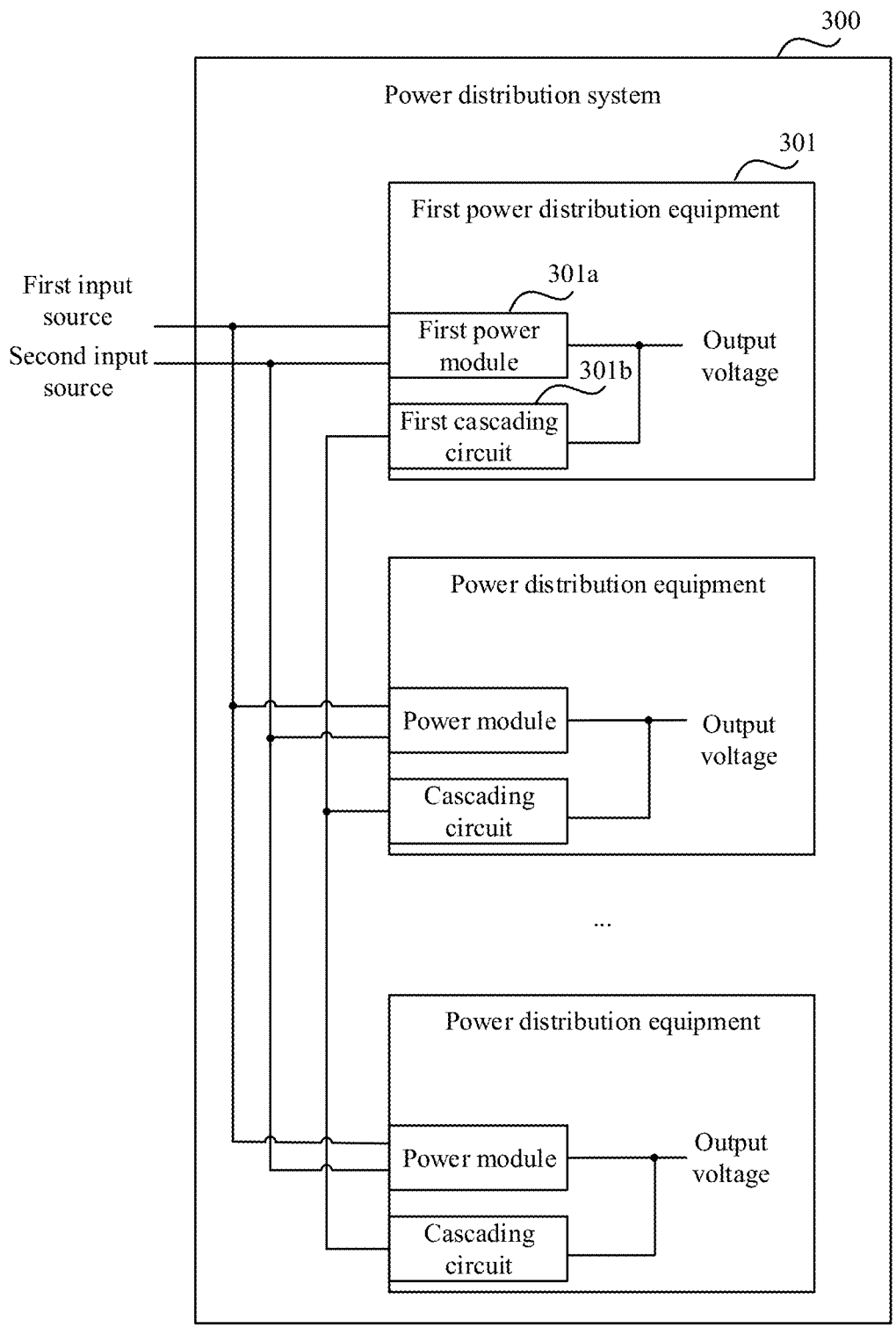
FIG. 4 is a schematic diagram of a structure of a second power distribution system according to an embodiment of this application.

In manner 1, the first power module 301a is a dual-input power supply, and the first power module 301a may choose between inputs of two input sources through switching to implement input source backup, as shown in FIG. 4.

In one embodiment, the power distribution system 300 shown in FIG. 4 implements input source backup in the following manner: the first power module 301a may select a first input source or a second input source to provide an input voltage for the first power distribution equipment 301. Because the first power module 301a may select the first input source or the second input source to provide the input voltage for the first power distribution equipment 301, when the first input source encounters a power supply exception, the first power module 301a may select the second input source to provide the input voltage for the first power distribution equipment 301; when the second input source encounters a power supply exception, the first power module 301a may select the first input source to provide the input voltage for the first power distribution equipment 301; and when neither the first input source nor the second input source encounters a power supply exception, the first power module 301a may select either of the first input source and the second input source to provide the input voltage to the first power distribution equipment 301.

It can be easily seen that, in manner 1, a power module in each power distribution equipment is a dual-input power supply.

In actual application, the first power module 301a may include a relay module and a conversion module. The relay module may be configured to select the first input source or the second input source to provide the input voltage for the first power distribution equipment 301; and the conversion module is coupled to the relay module and is configured to perform voltage conversion on the input voltage to obtain the output voltage.

For example, the conversion module may be a direct current-direct current (DC-DC) converter, or may be an alternating current-alternating current (AC-DC) converter.

Figure 5:
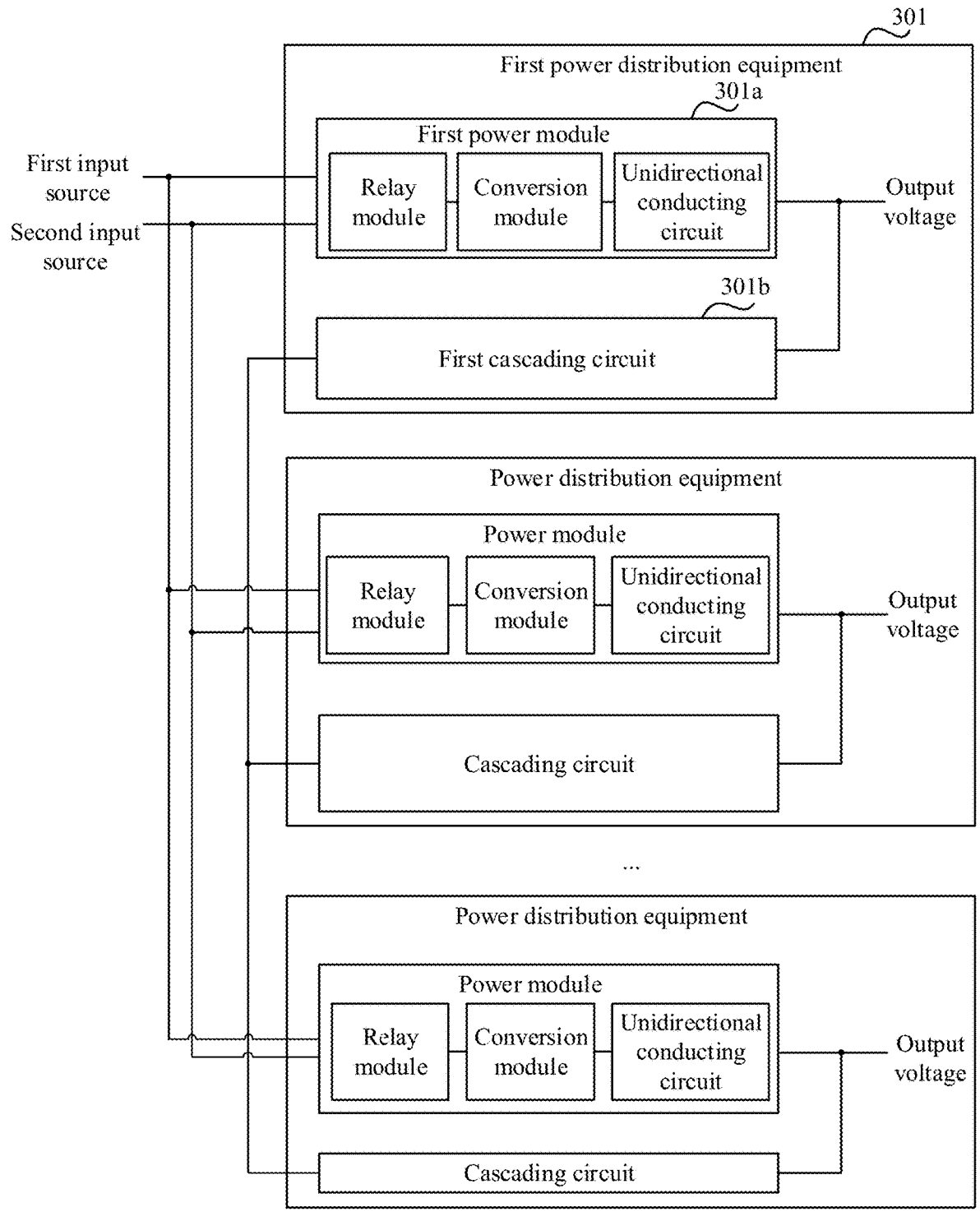
FIG. 5 is a schematic diagram of a structure of a third power distribution system according to an embodiment of this application.

In addition, as shown in FIG. 5, the first power module 301a may further include: a unidirectional conducting circuit, coupled to the conversion module and configured to disconnect the conversion module from the output of the first power module 301a when the first power module 301a is faulty. For example, the unidirectional conducting circuit is on when the first power module 301a is not faulty, or the unidirectional conducting circuit is off when the first power module 301a is faulty.

The unidirectional conducting circuit may also be referred to as an ORing circuit. The ORing circuit can implement an isolation function when a power supply is faulty, thereby preventing the failed power supply from affecting normal operation of another power supply. For example, in a normal state of the first power module 301a in the first power distribution equipment, the unidirectional conducting circuit is on, and the first power module 301a supplies power externally by using the unidirectional conducting circuit; or in an abnormal state of the first power module 301a, the unidirectional conducting circuit is off, so as to avoid affecting normal operation of a power module in another power distribution equipment.

In actual application, the unidirectional conducting circuit may be implemented by using a switching transistor and a control circuit, and the control circuit is configured to control the switching transistor to be on or off. When the switching transistor is on, the unidirectional conducting circuit is on. When the switching transistor is off, the unidirectional conducting circuit is off. The switching transistor may be, for example, a metal-oxide semiconductor field-effect transistor (MOSFET), a gallium nitride (GaN) transistor, an insulated gate bipolar transistor (IGBT), or a bipolar junction transistor (BJT).

Manner 2

In manner 2, the first power module 301a is a single-input power supply. Some power distribution equipments in the power distribution system 300 provide input voltages by using a first input source, and the other power distribution equipments provide input voltages by using a second input source. The power distribution equipments that provide the input voltages by using the first input source are referred to as the first power distribution equipments 301, and the power distribution equipments that provide the input voltages by using the second input source are referred to as the second power distribution equipments 302. In this embodiment of this application, quantities of the first power distribution equipments and the second power distribution equipments are not limited, and the quantity of the first power distribution equipments may be the same as or different from the quantity of the second power distribution equipments.

Figure 6:
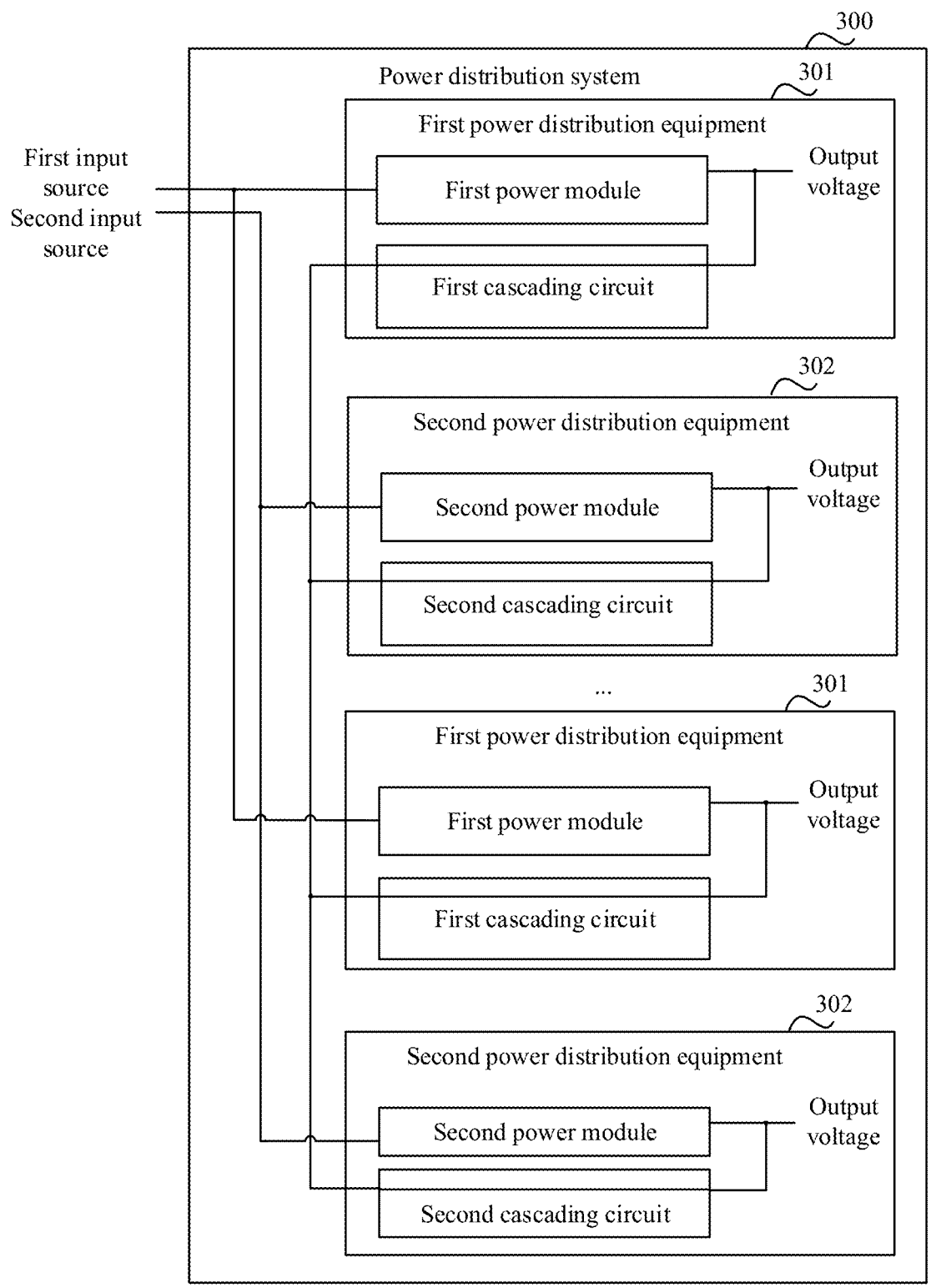
FIG. 6 is a schematic diagram of a structure of a fourth power distribution system according to an embodiment of this application.

In one embodiment, as shown in FIG. 6, when performing voltage conversion on the input voltage, the first power module 301a is configured to: perform voltage conversion on an input voltage provided by the first input source to obtain an output voltage; and the second power distribution equipment 302 in the power distribution system 300 includes: a second power module, configured to perform voltage conversion on an input voltage provided by the second input source to obtain an output voltage, where the output voltage is a supply voltage of the second power distribution equipment 302; and a second cascading circuit, configured to connect an output of the second power module to an output of a power module in power distribution equipment in the power distribution system other than the second power distribution equipment 302.

In one embodiment, the second cascading circuit may be a cascading box.

It can be easily seen that, in manner 2, a power module in each power distribution equipment is a single-input power supply.

In the power distribution system 300, supply voltages of all the power distribution equipments are the same, that is, output voltages of all power modules are the same, for example, may be 12 V.

Different from manner 1, in manner 2, the input source backup may be implemented in the following manner: when the first input source encounters a power supply exception, the second power module in the second power distribution equipment 302 supplies power to the first power distribution equipment 301 by using the first cascading circuit; and when the second input source encounters a power supply exception, the first power module in the first power distribution equipment 301 supplies power to the second power distribution equipment 302 by using the second cascading circuit.

Because a power module in the power distribution system 300 is a single-input power supply, when an input source encounters a power supply exception, power distribution equipment powered by the input source cannot select another input source by using the power module. Instead, a power module in power distribution equipment whose input voltage is provided by another input source needs to supply power to the power distribution equipment.

In one embodiment, because the first cascading circuit is configured to connect the output of the first power module to the output of the power module in the power distribution equipment in the power distribution system other than the first power distribution equipment 301, the second cascading circuit is configured to connect the output of the second power module to the output of the power module in the power distribution equipment in the power distribution system other than the second power distribution equipment 302. That is, in the power distribution system 300, an output of a power module in each power distribution equipment is connected by using a cascading circuit. Then, when the first input source encounters a power supply exception, the second power distribution equipment 302 may supply power to the first power distribution equipment 301 by using the second cascading circuit and the first cascading circuit. Similarly, when the second input source encounters a power supply exception, the first power distribution equipment 301 may supply power to the second power distribution equipment 302 by using the first cascading circuit and the second cascading circuit, thereby implementing input source backup.

Similar to manner 1, the first power module and the second power module each may include a conversion module, for example, a DC-DC converter or an AC-DC converter.

Figure 7:
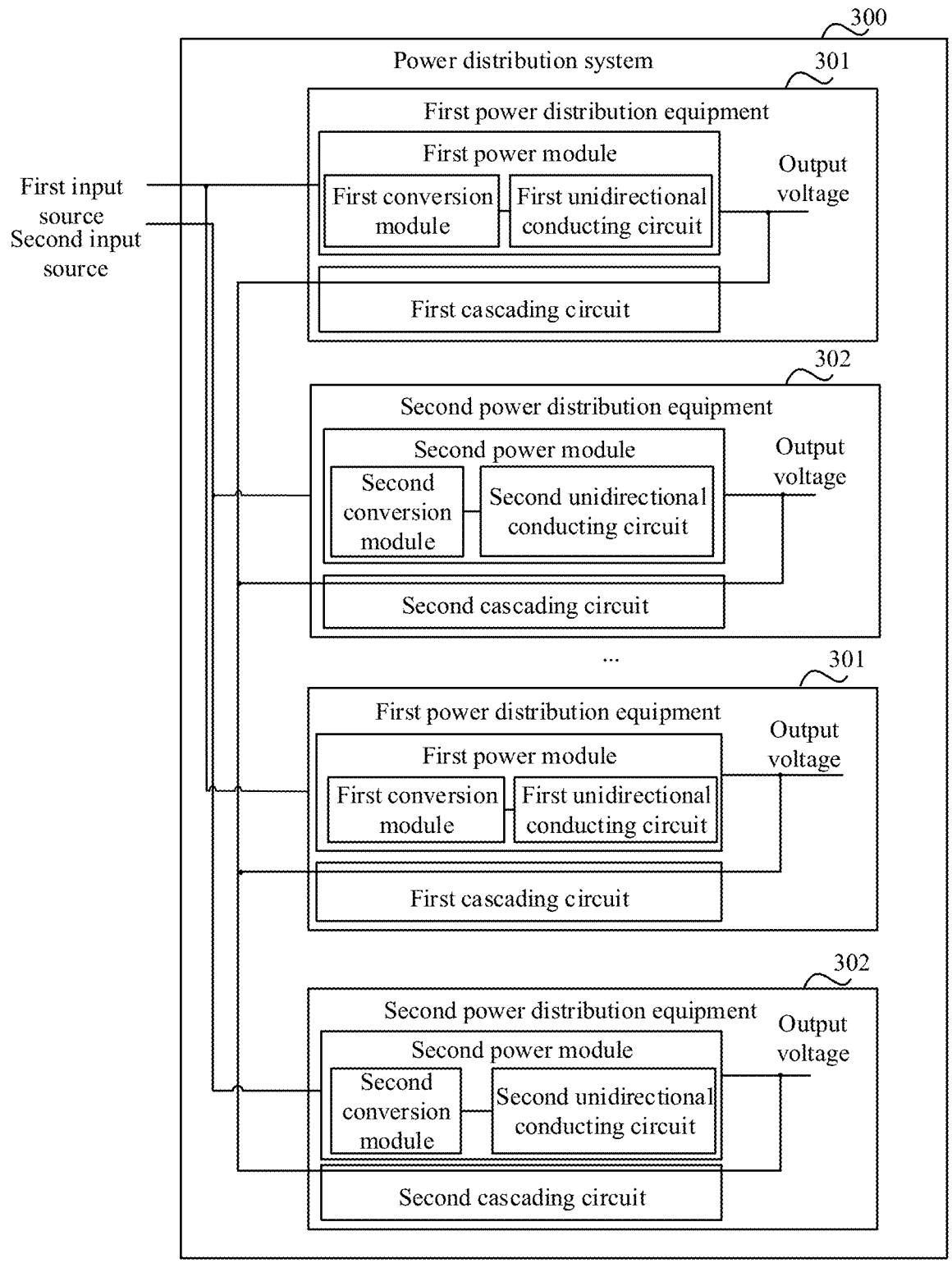
FIG. 7 is a schematic diagram of a structure of a fifth power distribution system according to an embodiment of this application.

In addition, as shown in FIG. 7, the first power module may include: a first conversion module, configured to perform voltage conversion on the input voltage provided by the first input source, to obtain the output voltage; and a first unidirectional conducting circuit, coupled to the first conversion module and configured to disconnect the first conversion module from the output of the first power module when the first power module is faulty. The second power module may include: a second conversion module, configured to perform voltage conversion on the input voltage provided by the second input source, to obtain the output voltage; and a second unidirectional conducting circuit, configured to disconnect the second conversion module from the output of the second power module when the second power module is faulty.

For example, the first unidirectional conducting circuit is off when the first power module is faulty; or the second unidirectional conducting circuit is off when the second power module is faulty.

Similar to the unidirectional conducting circuit in manner 1, in manner 2, the first unidirectional conducting circuit and the second unidirectional conducting circuit each may also be implemented by using a switching transistor and a control circuit, and details are not described herein again.

The foregoing describes the two manners of implementing input source backup in the power distribution system 300 provided in this embodiment of this application.

In addition, when the first power module 301a is faulty, the power module in the power distribution equipment in the power distribution system 300 other than the first power distribution equipment 301 may supply power to the first power distribution equipment 301 by using the first cascading circuit 301b. Because all power distribution equipments have unequal distances to the first power distribution equipment 301, a phenomenon may occur, in which power distribution equipment closer to the first power distribution equipment 301 has a larger output current (a higher output power) and power distribution equipment farther from the first power distribution equipment 301 has a smaller output current (a lower output power).

To avoid the foregoing phenomenon, a current equalization circuit may be disposed in the first power module 301a. The current equalization circuit is configured to generate a current equalization signal when an output current of the first power module 301a is unequal to an output current of a power module in another power distribution equipment, where the current equalization signal is used to make the output current of the first power module 301a equal to the output current of the power module in the another power distribution equipment.

It should be noted that, a current equalization circuit of each power distribution equipment in the power distribution system 300 may be connected to a current equalization circuit of another power distribution equipment by using a cascading circuit. For a implementation of the current equalization circuit, refer to a description in the conventional technologies. Details are not described herein again.

As described above, when the first power module 301a is faulty, the power module in the power distribution equipment in the power distribution system 300 other than the first power distribution equipment 301 may jointly supply power to the first power distribution equipment by using the first cascading circuit 301b. When a distance between power distribution equipments is long, a cascading line between cascading circuits is long, and a large parasitic inductance is generated on the cascading line. Consequently, oscillation is generated on the cascading line, and further a fluctuation is caused to supply voltages of the power distribution equipments, affecting normal operation of the power distribution equipments.

To avoid the foregoing phenomenon, an oscillation suppression circuit may be disposed in the first cascading circuit 301b. The oscillation suppression circuit is configured to suppress voltage oscillation generated on a cascading line between the output of the first power module 301a and an output of a power module in another power distribution equipment, so that the supply voltage of the first power distribution equipment 301 is stable.

In actual application, the oscillation suppression circuit may be a large capacitor. Certainly, other circuits that can suppress voltage oscillation are also applicable to this embodiment of this application, and are not enumerated herein.

Figure 8:
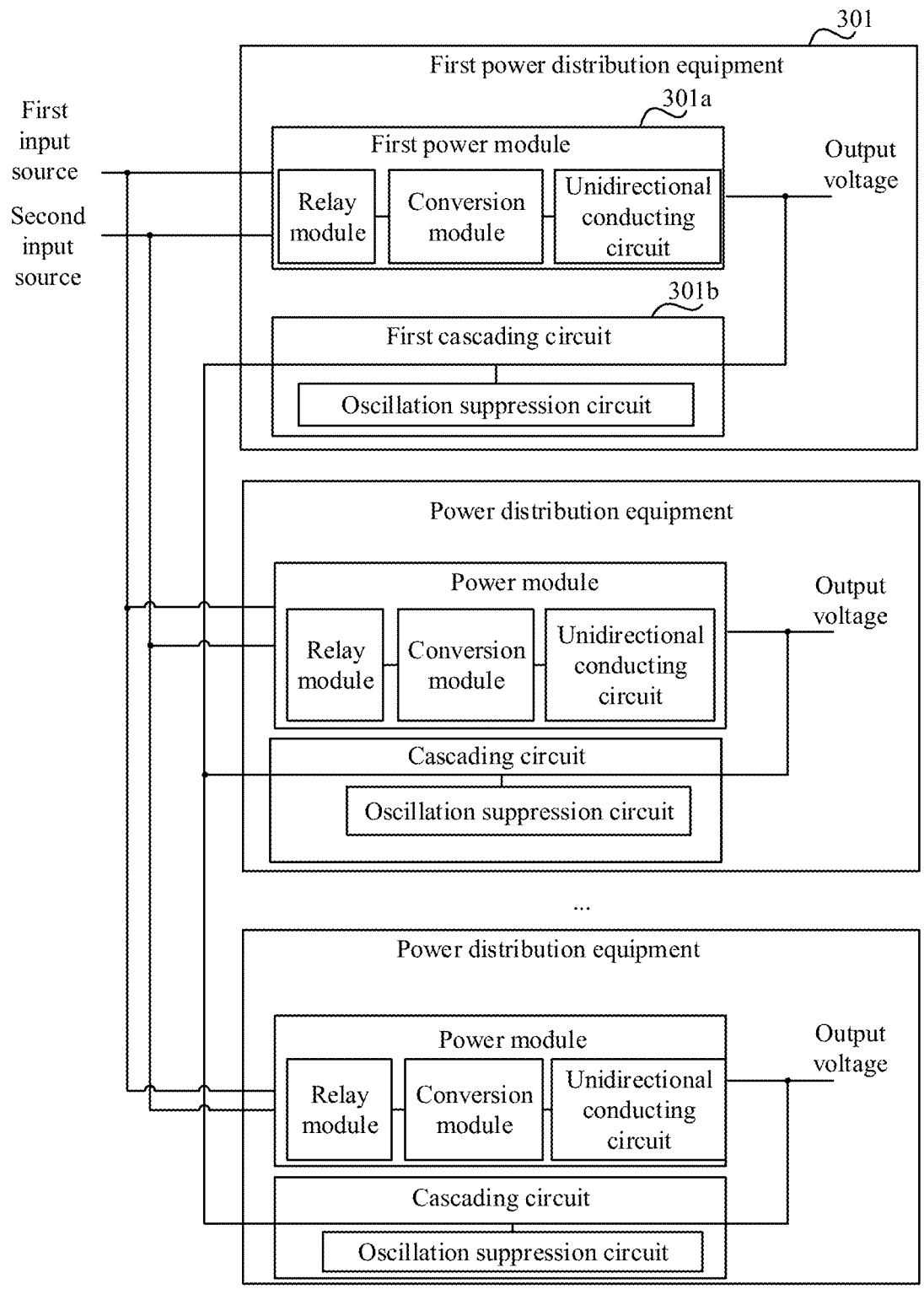
FIG. 8 is a schematic diagram of a structure of a sixth power distribution system according to an embodiment of this application.

For example, after the oscillation suppression circuit is configured in the power distribution system 300 shown in FIG. 5, a structure of the power distribution system 300 may be shown in FIG. 8.

In addition, a power backup unit may be further disposed in the first cascading circuit 301b. The power backup unit is configured to supply power to the first power distribution equipment 301 when both the first input source and the second input source encounter a power supply exception (for example, a mains outage). In one embodiment, the power backup unit may include a battery and a battery management system (BMS).

Figure 9:
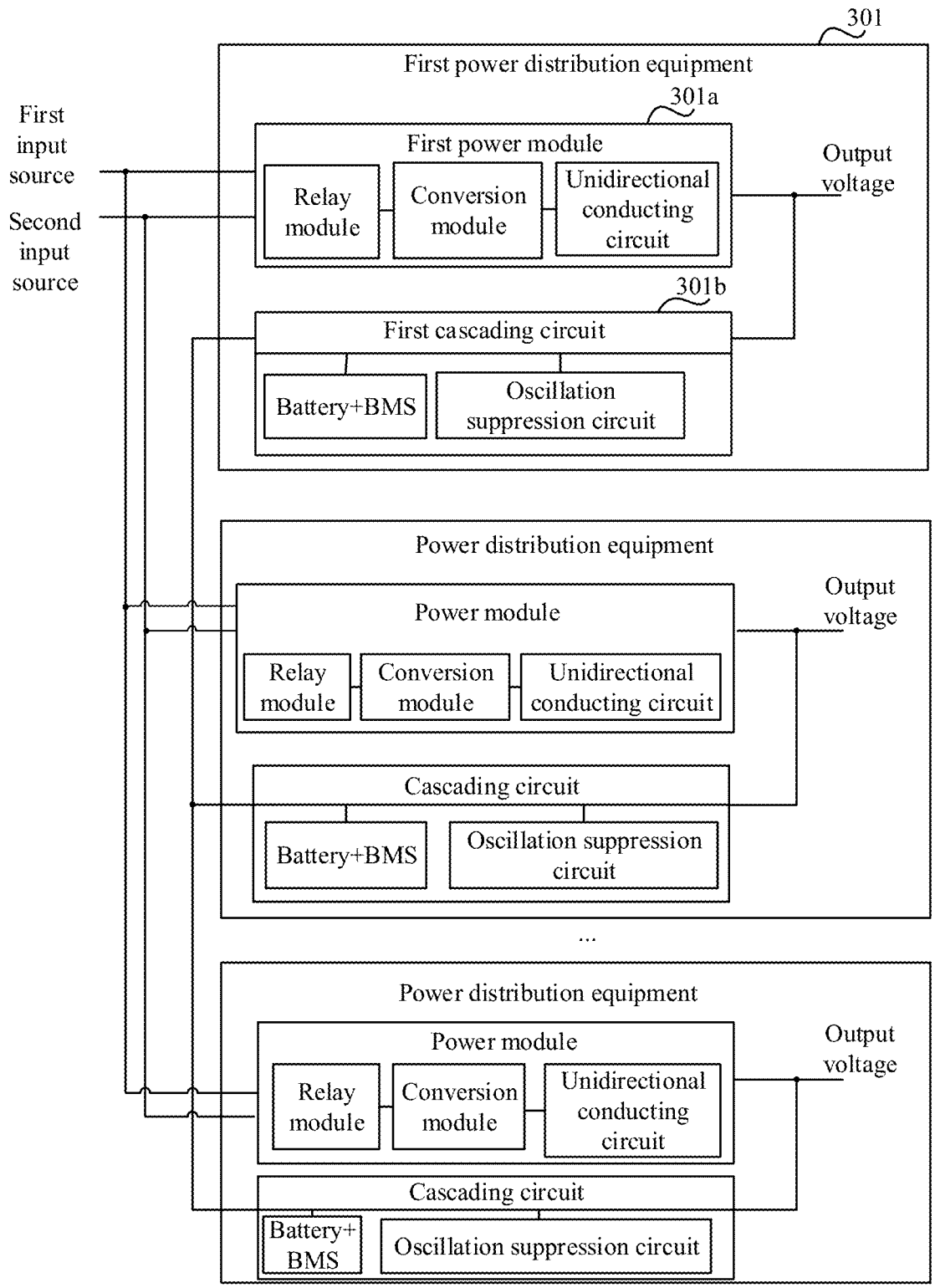
FIG. 9 is a schematic diagram of a structure of a seventh power distribution system according to an embodiment of this application.

For example, after the power backup unit is configured in the power distribution system 300 shown in FIG. 8, a structure of the power distribution system 300 may be shown in FIG. 9.

Upon a mains outage, both the first input source and the second output source fail, and cannot supply power to the power distribution equipment. In this embodiment of this application, the power backup unit may be disposed in the first cascading circuit 301b. The power backup unit includes a battery and a BMS. The power backup unit can supply power to the power distribution equipment upon a mains outage, thereby implementing power backup.

Figure 10:
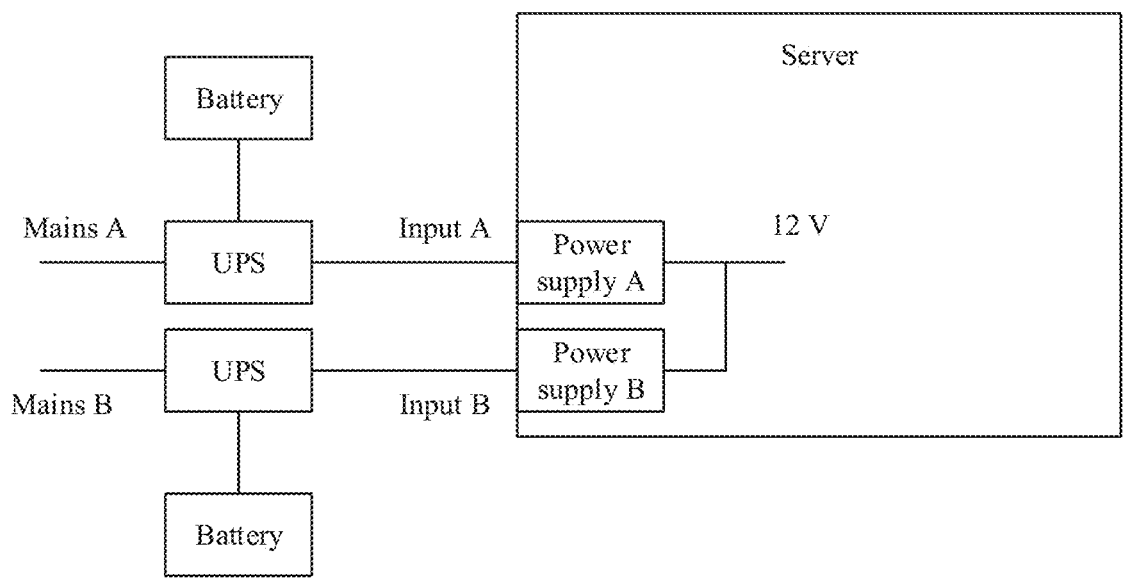
FIG. 10 is a schematic diagram of a power backup mode in the conventional technologies.

If the power backup unit is not disposed in the first cascading circuit 301b, in the conventional technologies, power backup needs to be implemented by using a battery and an uninterruptible power supply (UPS) after a mains input, as shown in FIG. 10. In this power backup mode, because the UPS is always connected in series in an entire power supply link, a power loss is caused. By using a battery and a BMS for power backup, an input source may be directly implemented by a mains input, thereby improving efficiency of the entire power supply link.

In conclusion, in the power distribution system 300 provided in this embodiment of this application, the first power distribution equipment 301 includes the first power module 301a and the first cascading circuit 301b. When the first power module 301a is faulty, the power module in the power distribution equipment in the power distribution system 300 other than the first power distribution equipment 301 jointly supplies power to the first power distribution equipment 301 by using the first cascading circuit 301b, so as to implement power supply backup. According to the power distribution system 300 provided in this embodiment of this application, redundancy configuration can be implemented for a power supply of power distribution equipment, and only one power module is disposed in each power distribution equipment. Compared with a solution in the conventional technologies that two power modules are configured in each power distribution equipment, in this application, backup costs are low, a load ratio of power distribution equipment is high, and a power supply conversion efficiency of the power distribution equipment is high.

In addition, by using the power distribution system 300 provided in this embodiment of this application, one power module and one cascading circuit are configured in each power distribution equipment. The power distribution equipment can reduce a quantity of configured power supplies based on power distribution equipment provided in the conventional technologies, without changing a form, size, and interface of the existing power distribution equipment, featuring high applicability.

The following describes four particular examples of the power distribution system 300 provided in the embodiments of this application.

Example 1

Figure 11A:
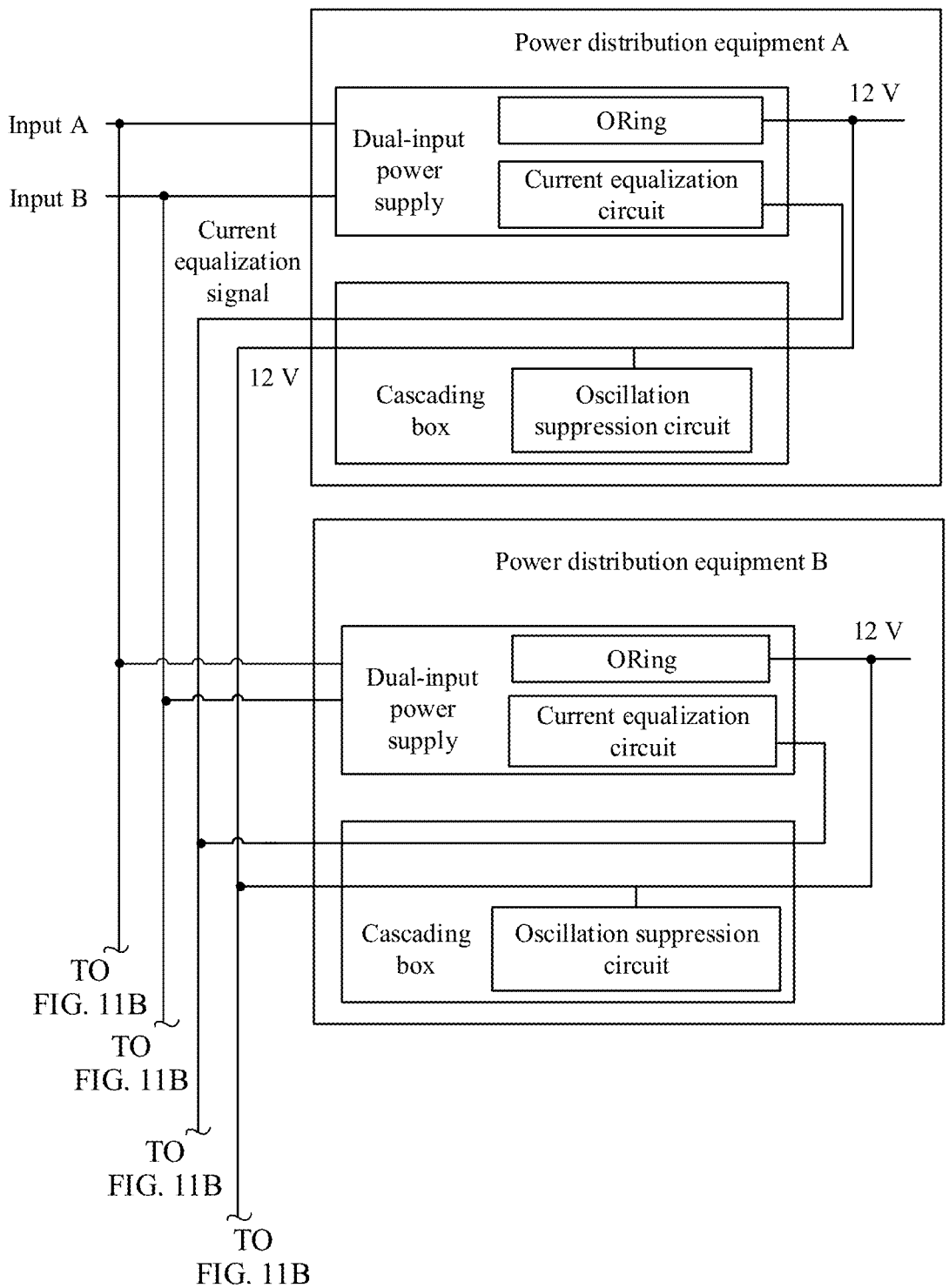
FIG. 11A and FIG. 11B are a schematic diagram of a structure of an eighth power distribution system according to an embodiment of this application.
Figure 11B:
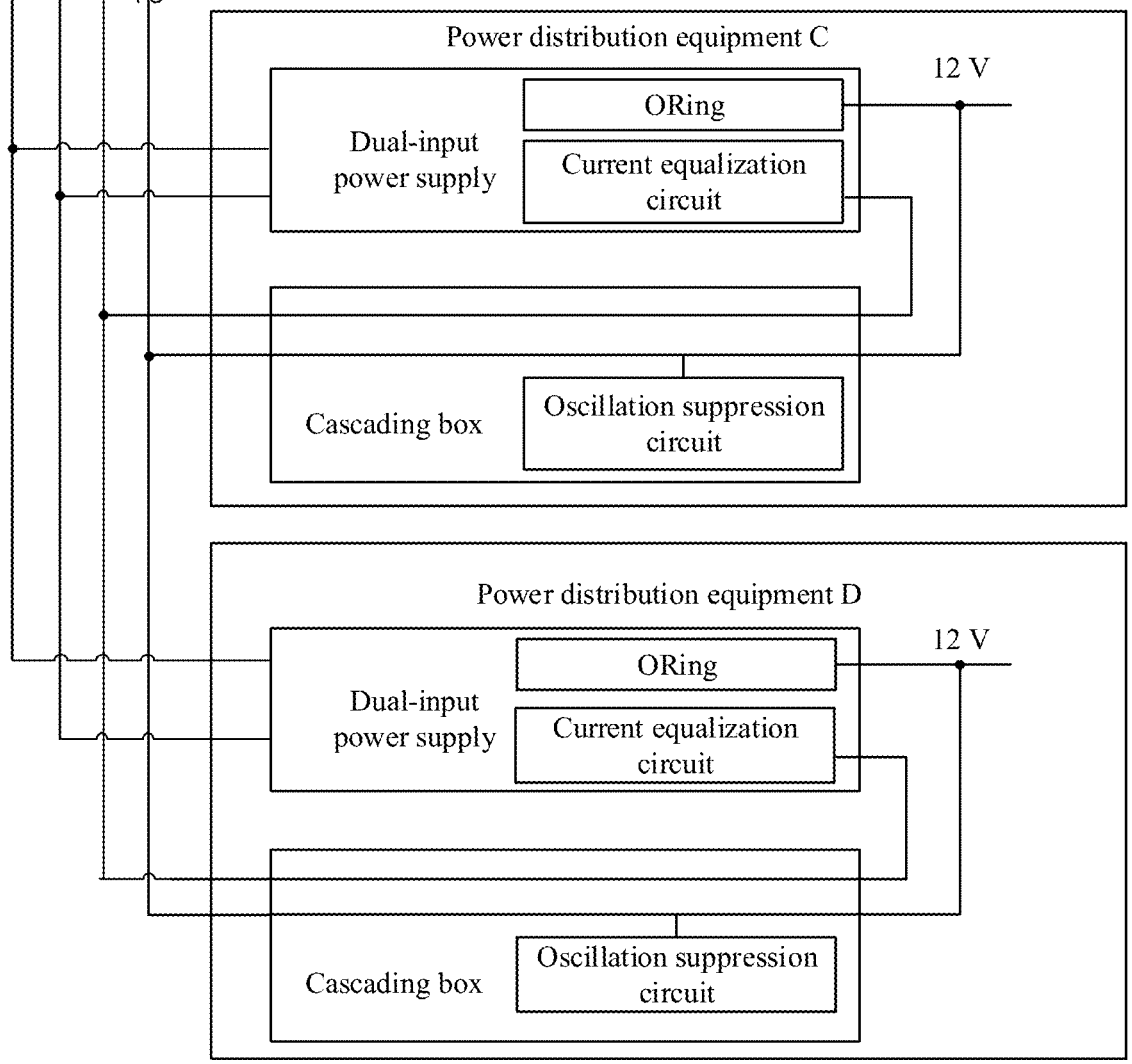

FIG. 11A and FIG. 11B are a schematic diagram of a structure of a power distribution system according to an embodiment of this application. The power distribution system may be considered as a example of the foregoing power distribution system 300. The power distribution system includes four power distribution equipments: power distribution equipment A, power distribution equipment B, power distribution equipment C, and power distribution equipment D.

Each power distribution equipment is configured with a dual-input power supply and a cascading box. The power supply supports two power inputs: input A and input B. An output voltage (12 V) supplies power to the power distribution equipment and is connected to outputs of the other power distribution equipments through the cascading box. In this way, when input A is abnormal, input B can properly supply power to the power supply. When one power supply is abnormal, power supplies of the other power distribution equipments can supply power to the power distribution equipment through the cascading box for backup. For example, when power supply A is abnormal, power supply B, power supply C, and power supply D jointly supply power to power distribution equipment A.

An ORing circuit inside a power supply can implement an isolation function when the power supply is faulty, thereby preventing the failed power supply from affecting normal operation of the other power supplies. For example, in a normal state of power supply A, the ORing circuit is on, and power supply A supplies power externally by using the ORing circuit; or in an abnormal state of power supply A, the ORing circuit is off, so as to avoid affecting normal operation of the other power supplies (power supply B, power supply C, and power supply D).

A power supply is internally provided with a current equalization circuit. The current equalization circuits of all the power supplies are also connected to each other through the cascading boxes, so that current equalization can be implemented between the power supplies. After a power supply is faulty, the other power supplies can provide equal supply currents for power distribution equipment with the faulty power supply to avoid power overload. For example, when power supply A fails, power supply B, power supply C, and power supply D each can supply ⅓ of a required current to power distribution equipment A through the current equalization circuit.

The cascading box is provided with an oscillation suppression circuit to suppress voltage oscillation generated on a cascading line. For example, when power supply A fails, power supply B, power supply C, and power supply D supply power to power distribution equipment A by using a cascading line. Because there is parasitic inductance on the cascading line, a voltage at an input of power distribution equipment A may oscillate. The oscillation suppression circuit can stabilize the voltage at the input of power distribution equipment A.

Example 2

Figure 12A:
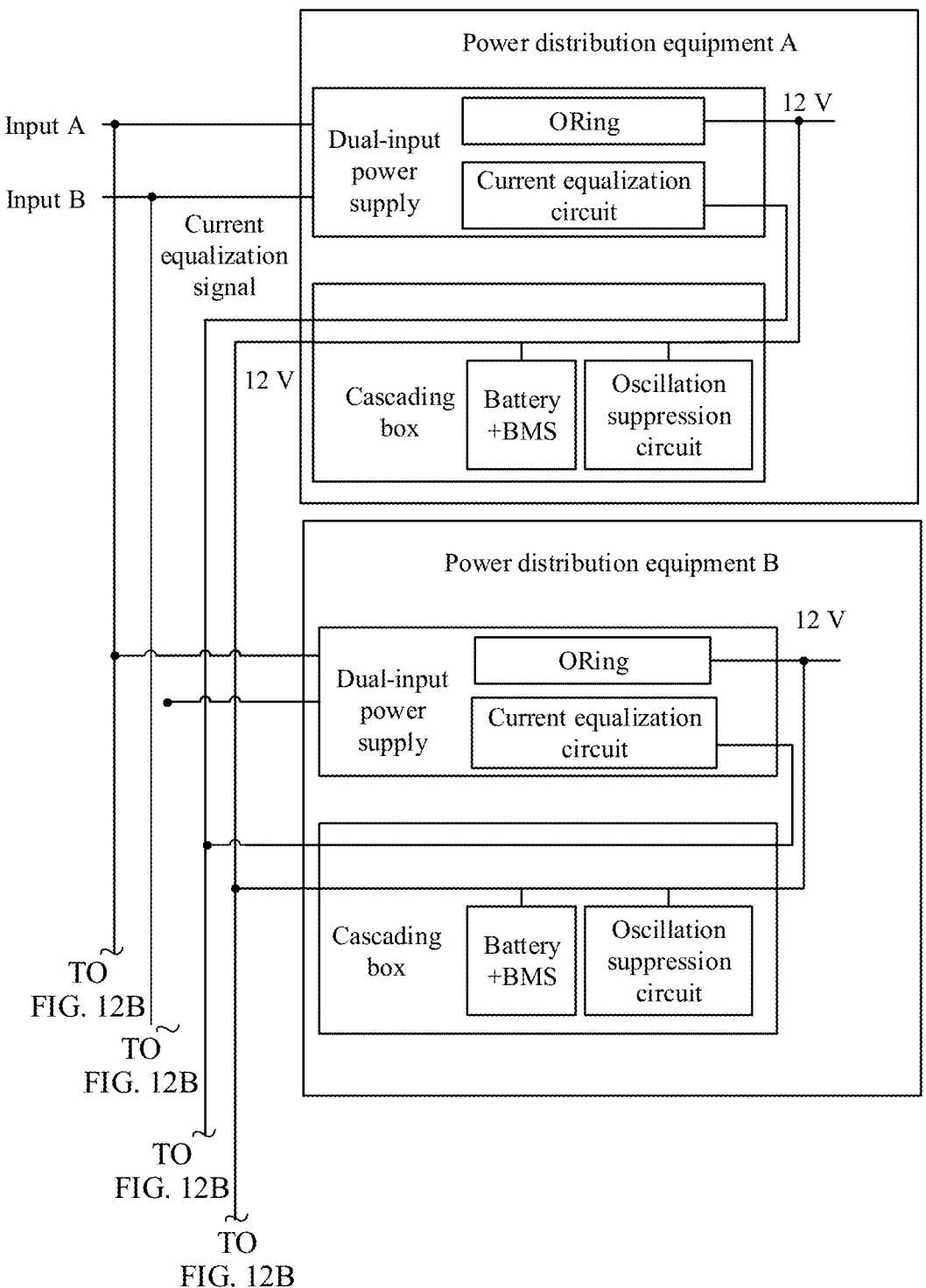
FIG. 12A and FIG. 12B are a schematic diagram of a structure of a ninth power distribution system according to an embodiment of this application.
Figure 12B:
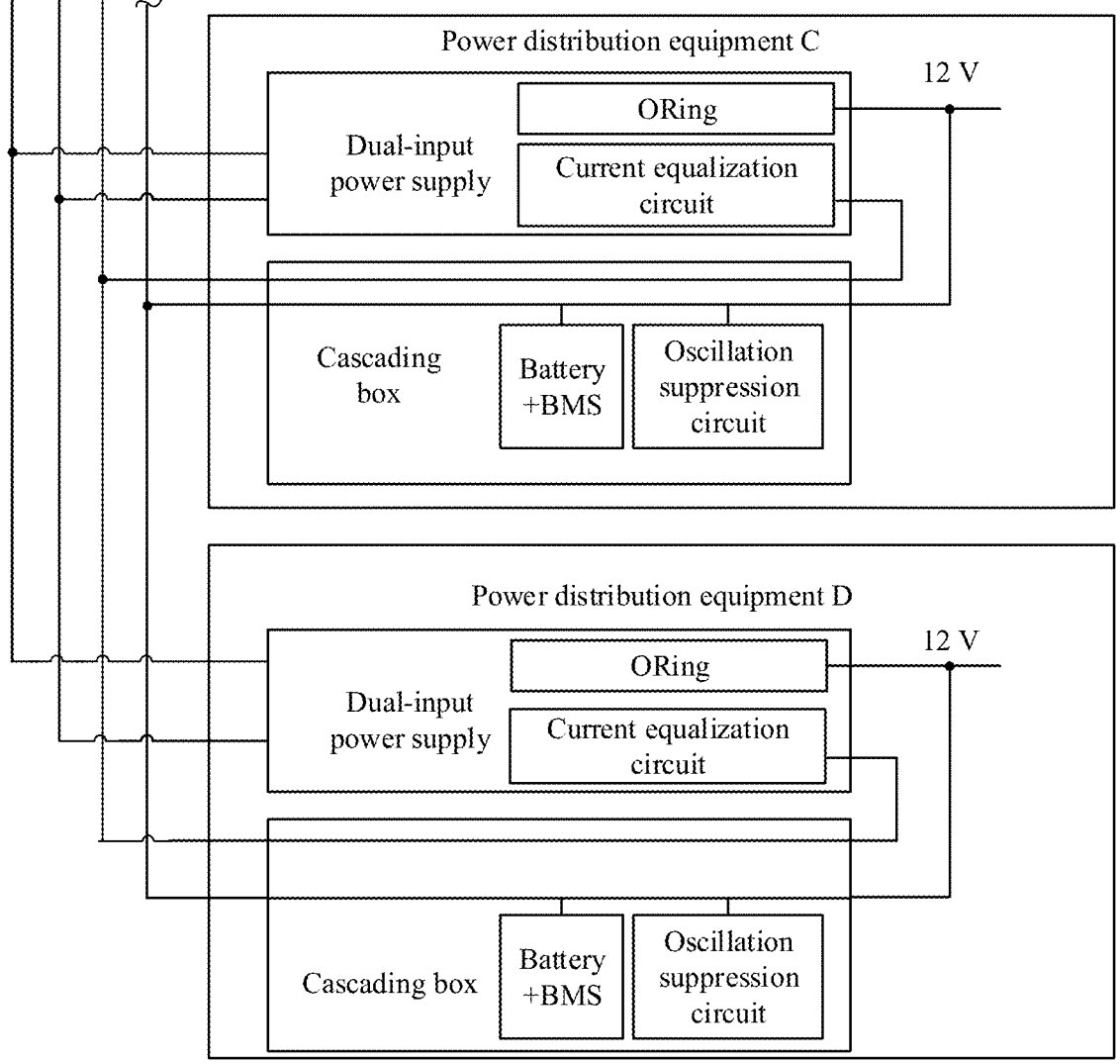

Based on example 1, as shown in FIG. 12A and FIG. 12B, a BMS+battery component is added to each cascading box in a power distribution system provided in example 2. When both input A and input B are abnormal (for example, a mains outage occurs), the BMS+battery in all cascading boxes can jointly supply power to all power distribution equipments to implement power backup.

Example 3

Figure 13A:
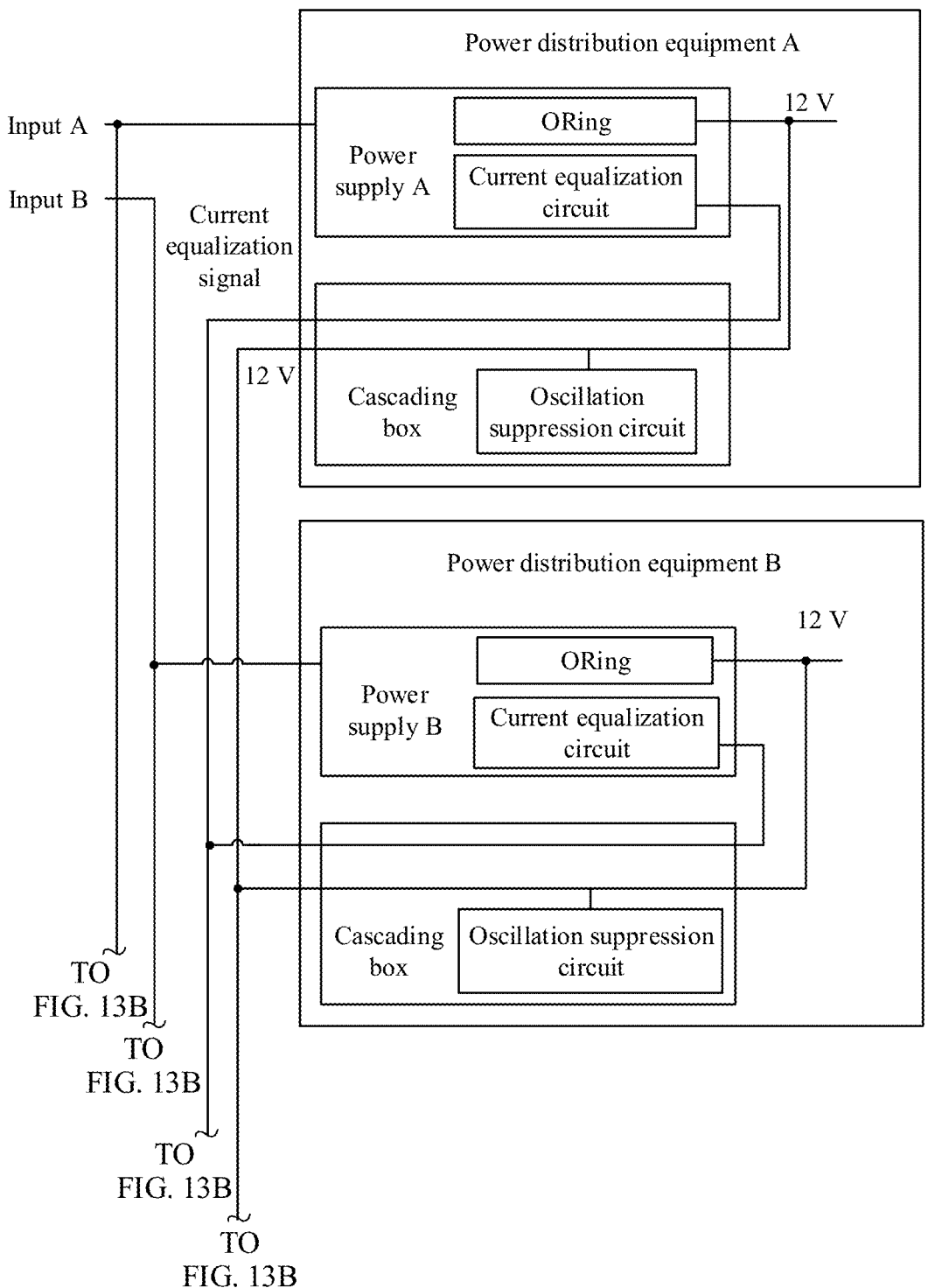
FIG. 13A and FIG. 13B are a schematic diagram of a structure of a tenth power distribution system according to an embodiment of this application.
Figure 13B:
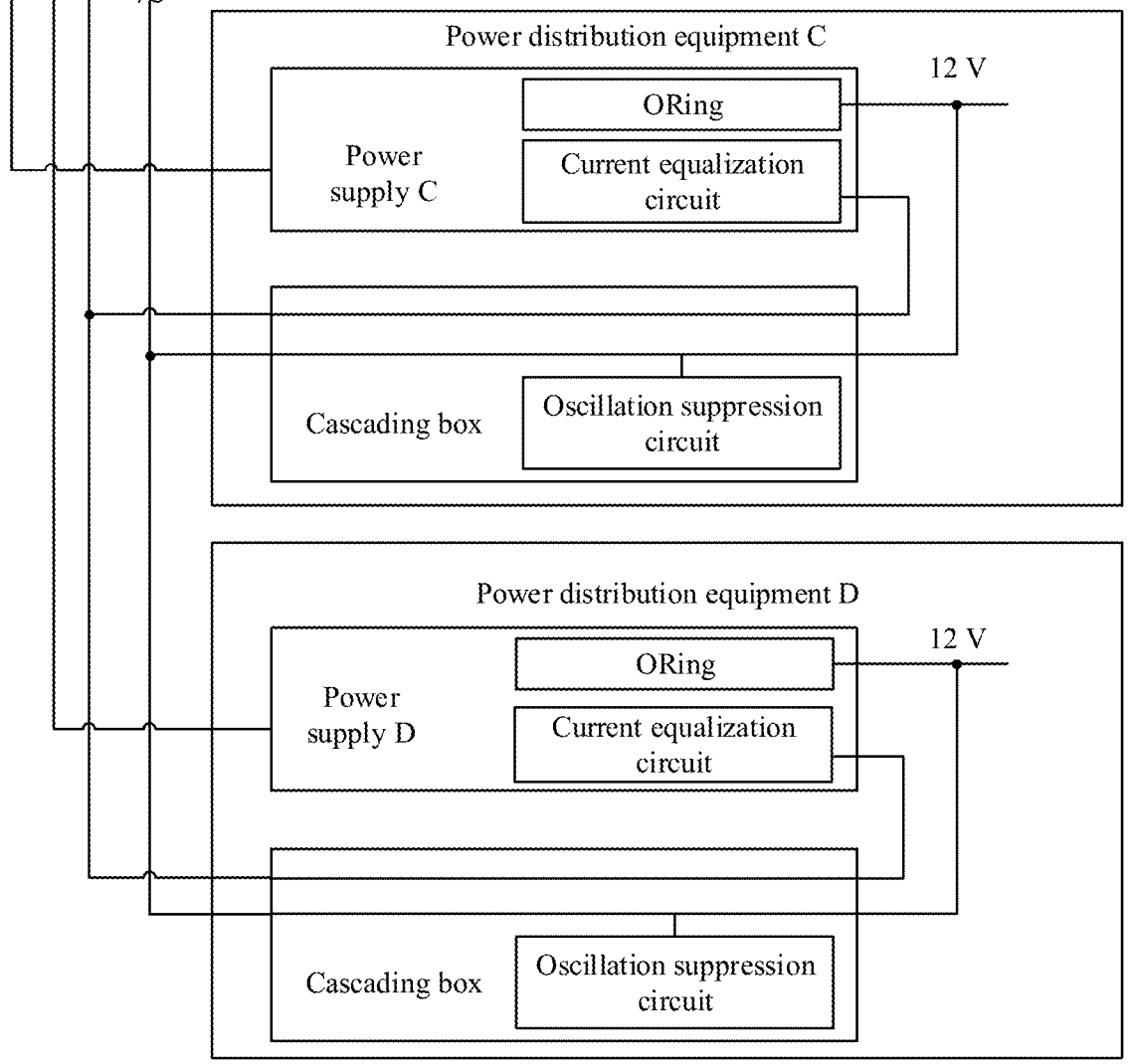

FIG. 13A and FIG. 13B are a schematic diagram of a structure of a power distribution system according to an embodiment of this application. The power distribution system may be considered as a example of the foregoing power distribution system 300. The power distribution system includes four power distribution equipments: power distribution equipment A, power distribution equipment B, power distribution equipment C, and power distribution equipment D.

Each power distribution equipment is configured with a single-input power supply and a cascading box. Some power supplies (for example, power supply A and power supply C) are powered by input A and the other power supplies are powered by input B. An output voltage (12 V) supplies power to the power distribution equipment and is connected to outputs of the other power distribution equipments through the cascading box. In this way, when input A is abnormal, input B can ensure normal operation of power supply B and power supply D, and power supply B and power supply D jointly supply power to power distribution equipment A and power distribution equipment C. When one power supply is abnormal, power supplies of the other power distribution equipments can supply power to the power distribution equipment through the cascading box for backup. For example, when power supply A is abnormal, power supply B, power supply C, and power supply D jointly supply power to power distribution equipment A.

An ORing circuit inside a power supply can implement an isolation function when the power supply is faulty, thereby preventing the failed power supply from affecting normal operation of the other power supplies. For example, in a normal state of power supply A, the ORing circuit is on, and power supply A supplies power externally by using the ORing circuit; or in an abnormal state of power supply A, the ORing circuit is off, so as to avoid affecting normal operation of the other power supplies (power supply B, power supply C, and power supply D).

A power supply is internally provided with a current equalization circuit. The current equalization circuits of all the power supplies are also connected to each other through the cascading boxes, so that current equalization can be implemented between the power supplies. In addition, after a power supply is faulty, the other power supplies can provide equal supply currents for power distribution equipment with the faulty power supply to avoid power overload. For example, when power supply A fails, power supply B, power supply C, and power supply D each can supply ⅓ of a required current to power distribution equipment A through the current equalization circuit.

The cascading box is provided with an oscillation suppression circuit to suppress voltage oscillation generated on a cascading line. For example, when power supply A fails, power supply B, power supply C, and power supply D supply power to power distribution equipment A by using a cascading line. Because there is parasitic inductance on the cascading line, a voltage at an input of power distribution equipment A may oscillate. The oscillation suppression circuit can stabilize the voltage at the input of power distribution equipment A.

Example 4

Figure 14A:
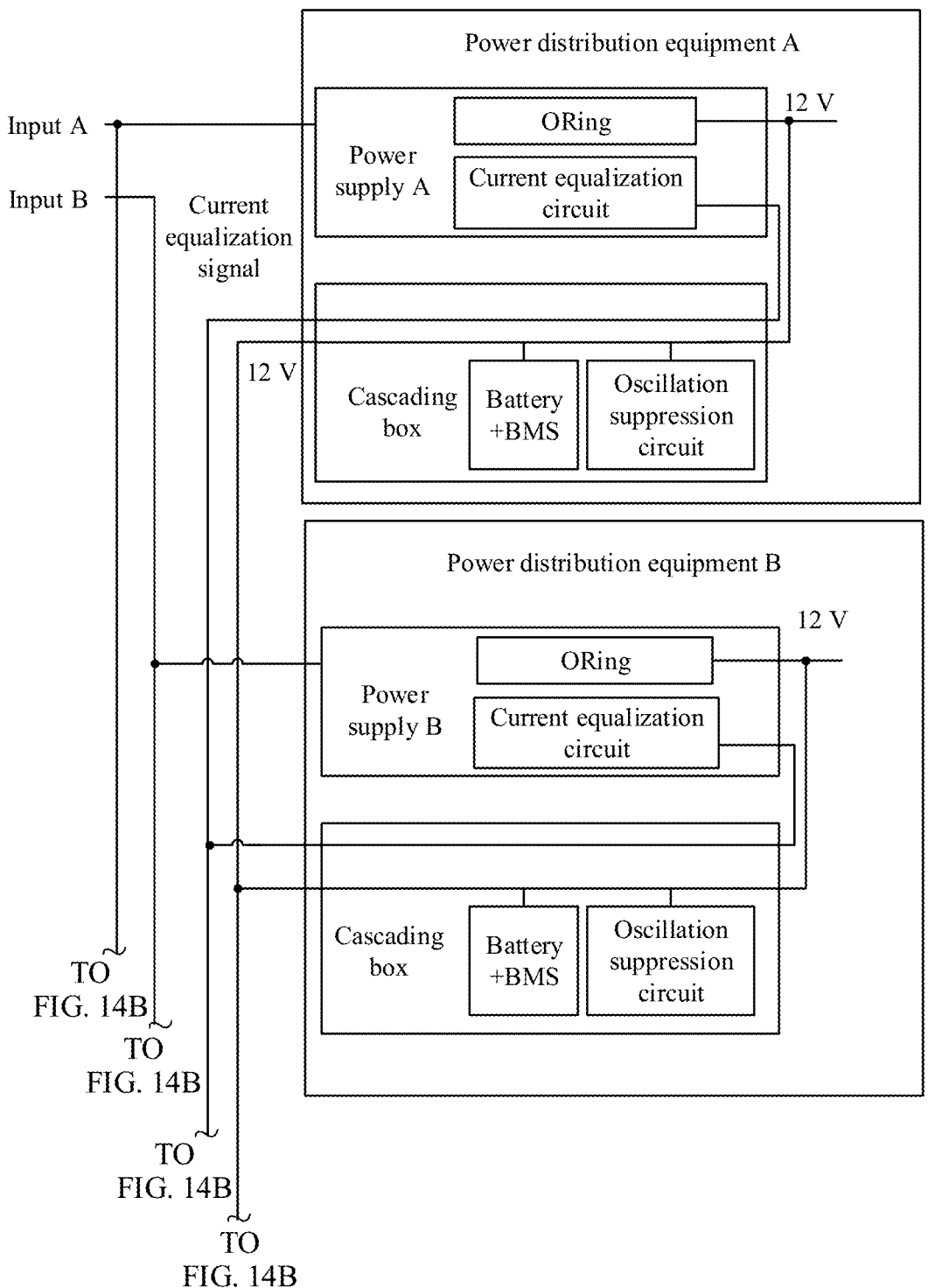
FIG. 14A and FIG. 14B are a schematic diagram of a structure of an eleventh power distribution system according to an embodiment of this application.
Figure 14B:
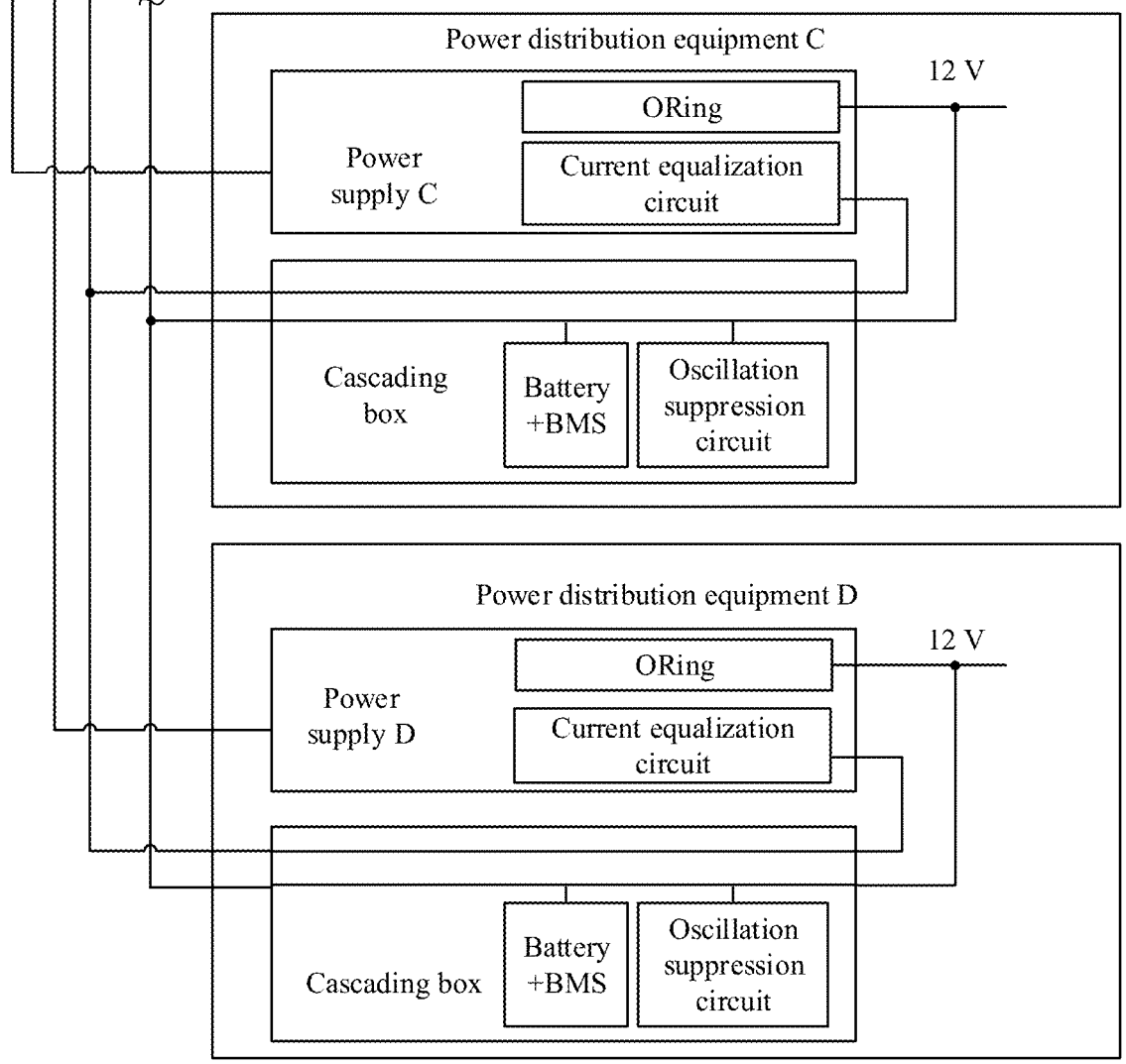

Based on example 3, as shown in FIG. 14A and FIG. 14B, a BMS+battery component is added to each cascading box in a power distribution system provided in example 4. When both input A and input B are abnormal (for example, a mains outage occurs), the BMS+battery in all cascading boxes can jointly supply power to all power distribution equipments to implement power backup.

Figure 1:
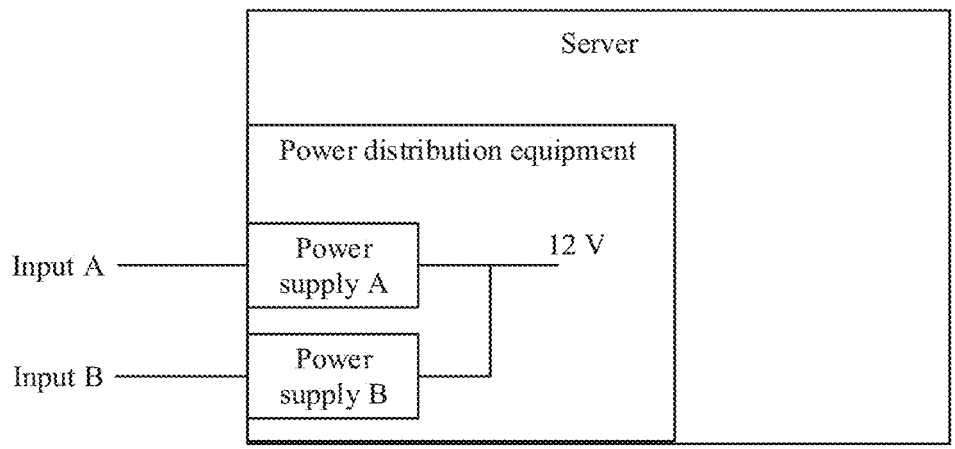
FIG. 1 is a schematic diagram of a structure of a power architecture of power distribution equipment in the conventional technologies.
Figure 2:
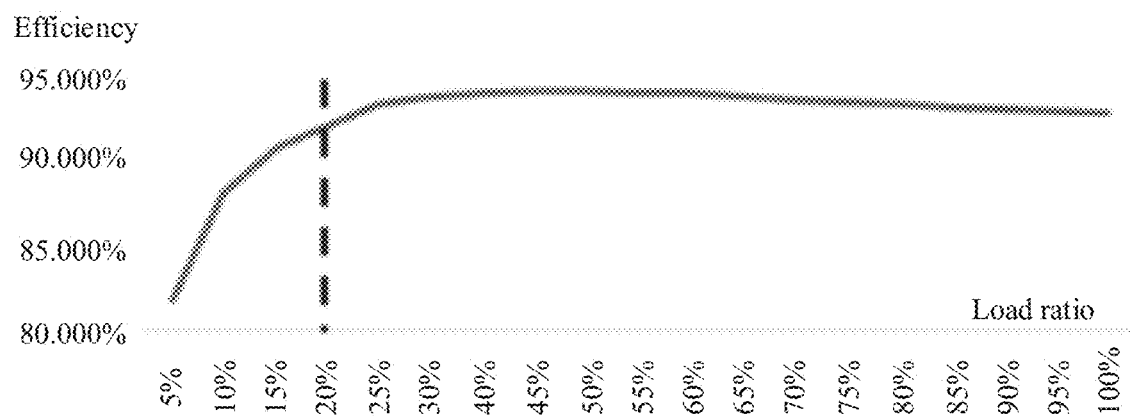
FIG. 2 is a schematic diagram of a relationship between a load ratio of power distribution equipment and power supply conversion efficiency of the power distribution equipment in the conventional technologies.
Figure 15:
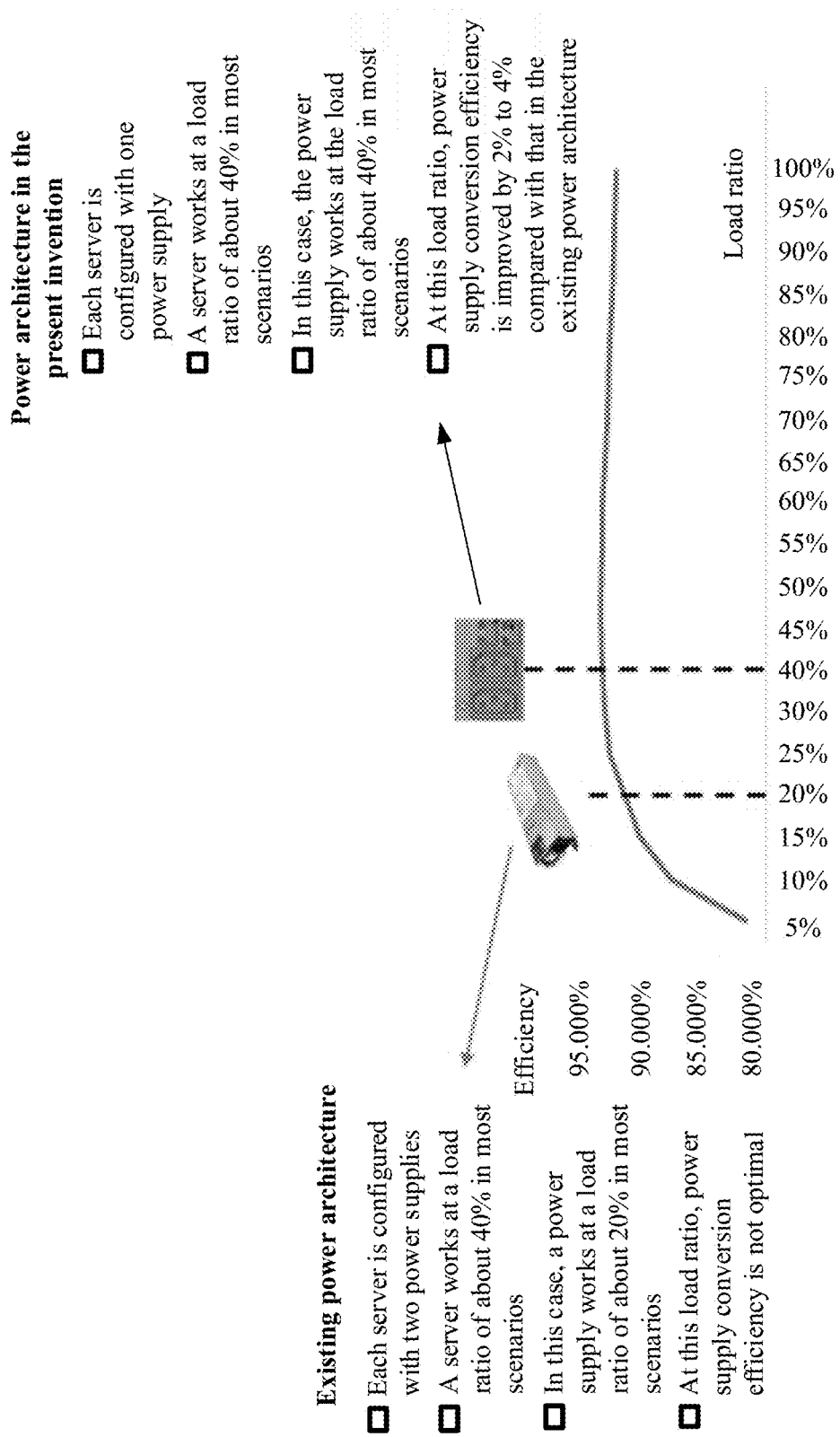
FIG. 15 is a schematic diagram of a relationship between a load ratio of power distribution equipment and power supply conversion efficiency of the power distribution equipment according to an embodiment of this application.

As described in the background, if the power backup solution shown in FIG. 1 is used, each power distribution equipment is configured with two power supplies. Because the power distribution equipment works at a load ratio of about 40% in most scenarios, the power supplies each work at a load ratio of about 20% in most scenarios. At this load ratio, conversion efficiency of the power supplies is not optimal. If each power distribution equipment is configured with one power supply, as shown in FIG. 15, the power distribution equipment works at a load ratio of about 40% in most scenarios, and the power supply works at a load ratio of about 40% in most scenarios. At this load ratio, conversion efficiency of the power supply is improved by 2% to 4% compared with that in the existing power architecture.

Figure 16:
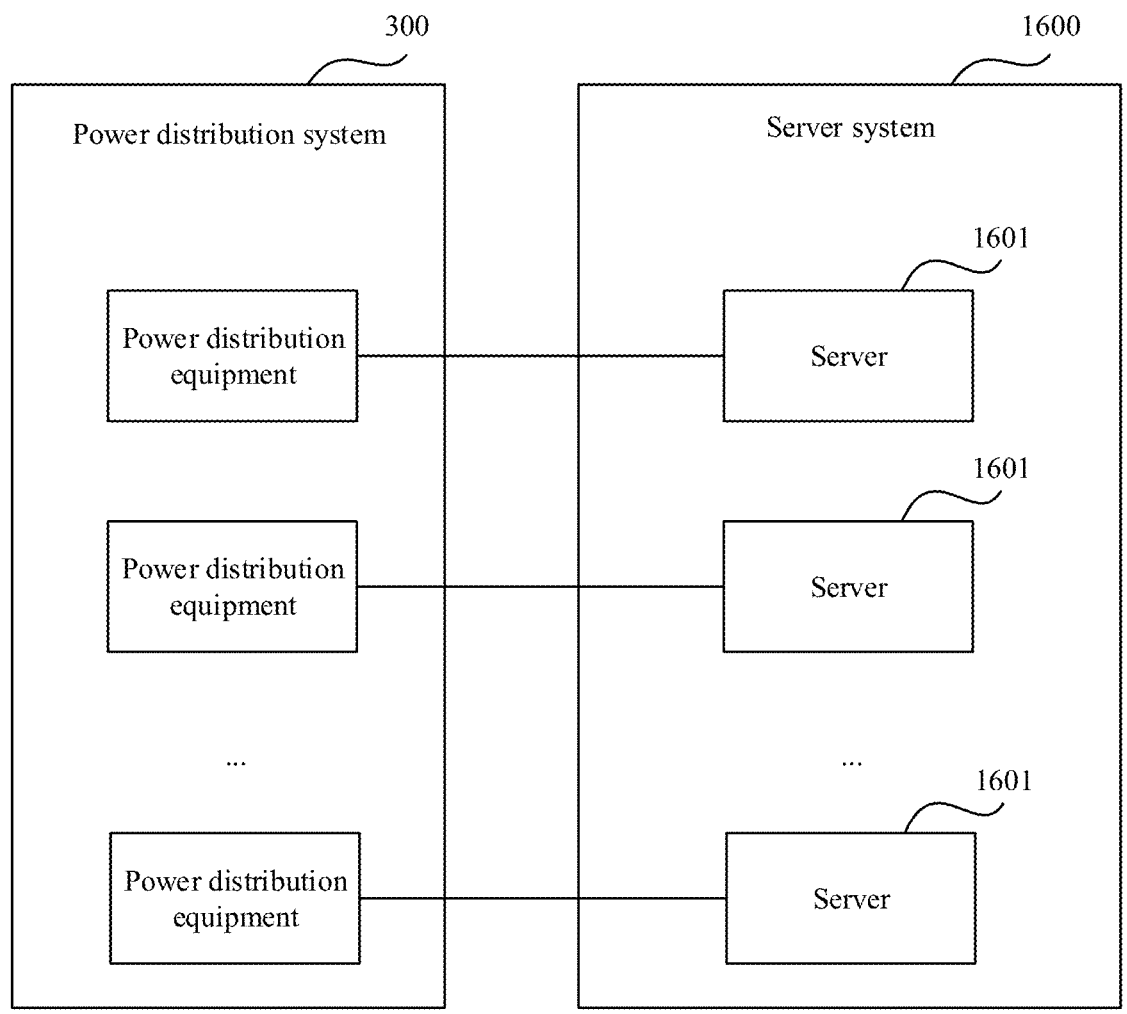
FIG. 16 is a schematic diagram of a structure of a server system according to an embodiment of this application.

Based on a same concept, an embodiment of this application further provides a server system. As shown in FIG. 16, the server system 1600 includes a plurality of servers 1601. The plurality of servers 1601 are powered by using the foregoing power distribution system 300. In one embodiment, each power distribution equipment in the power distribution system 300 is configured to supply power to one server 1601 in the server system 1600.

It is clear that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A power distribution system, wherein, the power distribution system comprises a plurality of power distribution equipments, and the plurality of power distribution equipments are configured to supply power to a plurality of powered devices, respectively, and a first power distribution equipment in the plurality of power distribution equipments comprises:
   a first power module configured to perform voltage conversion on an input voltage to obtain an output voltage, wherein the output voltage is a supply voltage of the first power distribution equipment, and wherein the first power module is configured to select a first input source or a second input source to provide the input voltage for the first power distribution equipment; and
   a first cascading circuit configured to connect an output of the first power module to an output of a power module in power distribution equipment in the power distribution system other than the first power distribution equipment, wherein the first power distribution equipment is any power distribution equipment in the power distribution system.

2. The power distribution system according to claim 1, wherein when the first power module is faulty, the power module in the power distribution equipment in the power distribution system other than the first power distribution equipment supplies power to the first power distribution equipment by using the first cascading circuit.

3. The power distribution system according to claim 1, wherein when selecting the first input source or the second input source to provide the input voltage for the first power distribution equipment, the first power module is configured to:
   when the first input source encounters a power supply exception, select the second input source to provide the input voltage for the first power distribution equipment; or
   when the second input source encounters a power supply exception, select the first input source to provide the input voltage for the first power distribution equipment.

4. The power distribution system according to claim 1, wherein the first power module comprises:
   a relay module configured to select the first input source or the second input source to provide the input voltage for the first power distribution equipment; and
   a conversion module coupled to the relay module and configured to perform voltage conversion on the input voltage to obtain the output voltage.

5. The power distribution system according to claim 4, wherein the first power module further comprises:
   a unidirectional conducting circuit coupled to the conversion module and configured to disconnect the conversion module from the output of the first power module when the first power module is faulty.

6. The power distribution system according to claim 5, wherein, the unidirectional conducting circuit is on when the first power module is not faulty, or the unidirectional conducting circuit is off when the first power module is faulty.

7. The power distribution system according to claim 1, wherein, when performing voltage conversion on the input voltage, the first power module is configured to:
perform voltage conversion on an input voltage provided by the first input source, to obtain an output voltage; and second power distribution equipment in the power distribution system comprises:
a second power module configured to perform voltage conversion on an input voltage provided by the second input source, to obtain an output voltage, wherein the output voltage is a supply voltage of the second power distribution equipment; and
a second cascading circuit configured to connect an output of the second power module to an output of a power module in power distribution equipment in the power distribution system other than the second power distribution equipment.

8. The power distribution system according to claim 7, wherein, when the first input source encounters a power supply exception, the second power module supplies power to the first power distribution equipment by using the second cascading circuit and the first cascading circuit; and
when the second input source encounters a power supply exception, the first power module supplies power to the second power distribution equipment by using the first cascading circuit and the second cascading circuit.

9. The power distribution system according to claim 7, wherein the first power module comprises:
a first conversion module, configured to perform voltage conversion on the input voltage provided by the first input source, to obtain the output voltage; and
a first unidirectional conducting circuit coupled to the first conversion module and configured to disconnect the first conversion module from the output of the first power module when the first power module is faulty; and
the second power module comprises:
a second conversion module, configured to perform voltage conversion on the input voltage provided by the second input source, to obtain the output voltage; and
a second unidirectional conducting circuit coupled to the second conversion module and configured to disconnect the second conversion module from the output of the second power module when the second power module is faulty.

10. The power distribution system according to claim 1, wherein the first power module comprises:
a current equalization circuit configured to generate a current equalization signal when an output current of the first power module is unequal to an output current of the power module in the power distribution equipment in the power distribution system other than the first power distribution equipment, wherein the current equalization signal is used to make the output current of the first power module equal to the output current of the power module in the power distribution equipment in the power distribution system other than the first power distribution equipment.

11. The power distribution system according to claim 1, wherein the first cascading circuit comprises:
an oscillation suppression circuit configured to suppress voltage oscillation generated on a cascading line between the output of the first power module and the output of the power module in the power distribution equipment in the power distribution system other than the first power distribution equipment.

12. The power distribution system according to claim 1, wherein the first cascading circuit comprises:
a power backup unit, wherein the power backup unit is configured to supply power to the first power distribution equipment when both the first input source and the second input source encounter a power supply exception.

13. The power distribution system according to claim 12, wherein the power backup unit comprises a battery and a battery management system (BMS).

14. The power distribution system according to claim 1, wherein the powered devices are servers.

15. A server system comprising:
a plurality of servers powered by using a power distribution system, wherein the power distribution system comprises:
a plurality of power distribution equipments, and the plurality of power distribution equipments are configured to supply power to a plurality of powered devices, respectively, and first power distribution equipment in the plurality of power distribution equipments comprises a first power module and a first cascading circuit;
wherein, the first power module is configured to perform voltage conversion on an input voltage to obtain an output voltage, wherein the output voltage is a supply voltage of the first power distribution equipment, and wherein the first power module is configured to select a first input source or a second input source to provide the input voltage for the first power distribution equipment; and
wherein, the first cascading circuit is configured to connect an output of the first power module to an output of a power module in power distribution equipment in the power distribution system other than the first power distribution equipment, wherein the first power distribution equipment is any power distribution equipment in the power distribution system.

16. The server system according to claim 15, wherein when the first power module is faulty, the power module in the power distribution equipment in the power distribution system other than the first power distribution equipment supplies power to the first power distribution equipment by using the first cascading circuit.

17. The server system according to claim 15, wherein, when selecting the first input source or the second input source to provide the input voltage for the first power distribution equipment, the first power module is configured to:
when, the first input source encounters a power supply exception, select the second input source to provide the input voltage for the first power distribution equipment; or
when, the second input source encounters a power supply exception, select the first input source to provide the input voltage for the first power distribution equipment.

18. The server system according to claim 15, wherein the first power module comprises:
a relay module configured to select the first input source or the second input source to provide the input voltage for the first power distribution equipment; and a conversion module coupled to the relay module and configured to perform voltage conversion on the input voltage to obtain the output voltage.

\* \* \* \* \*